US007760378B2

(12) United States Patent
Maruyama

(10) Patent No.: US 7,760,378 B2
(45) Date of Patent: Jul. 20, 2010

(54) PRINTER SERVER, CLIENT TERMINAL, IMAGE FORMING APPARATUS, PRINT DATA GENERATING METHOD, AND COMPUTER PRODUCT

(75) Inventor: Akeo Maruyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1302 days.

(21) Appl. No.: 10/935,257

(22) Filed: Sep. 7, 2004

(65) Prior Publication Data
US 2005/0057774 A1 Mar. 17, 2005

(30) Foreign Application Priority Data
Sep. 8, 2003 (JP) ............................. 2003-315845
Sep. 2, 2004 (JP) ............................. 2004-255156

(51) Int. Cl.
G06F 15/00 (2006.01)
B41J 1/00 (2006.01)
(52) U.S. Cl. .................... 358/1.15; 358/1.14; 358/1.9
(58) Field of Classification Search ................ 358/1.15, 358/1.9, 1.14, 1.13, 1.19; 709/223, 202, 709/233; 707/522, 512
See application file for complete search history.

(56) References Cited

U.S. PATENT DOCUMENTS

| 6,070,245 | A  | * | 5/2000  | Murphy et al. ............... 726/3 |
| 6,173,295 | B1 | * | 1/2001  | Goertz et al. ............... 715/209 |
| 6,181,893 | B1 |   | 1/2001  | Collard et al. |
| 6,330,611 | B1 |   | 12/2001 | Itoh et al. |
| 6,480,963 | B1 | * | 11/2002 | Tachibana et al. ............ 726/4 |
| 6,633,400 | B1 | * | 10/2003 | Sasaki et al. ............... 358/1.15 |
| 6,832,010 | B2 | * | 12/2004 | Miyazaki et al. ............. 382/305 |
| 6,978,299 | B1 | * | 12/2005 | Lodwick .................... 709/223 |
| 7,075,670 | B1 | * | 7/2006  | Koga ........................ 358/1.15 |
| 7,231,362 | B2 | * | 6/2007  | Wilce et al. .................. 705/35 |
| 7,440,962 | B1 | * | 10/2008 | Wong et al. ................. 707/102 |
| 2001/0029513 | A1 | * | 10/2001 | Kuwano et al. ............. 707/522 |
| 2002/0005134 | A1 | * | 1/2002  | Grosso et al. ............... 101/484 |
| 2002/0101600 | A1 | * | 8/2002  | Sabbagh et al. ............. 358/1.13 |
| 2003/0007179 | A1 | * | 1/2003  | Ferlitsch ................... 358/1.16 |
| 2003/0020939 | A1 |   | 1/2003  | Sugahara |

(Continued)

FOREIGN PATENT DOCUMENTS

EP 0944239 A1 9/1999

(Continued)

OTHER PUBLICATIONS

U.S. Appl. No. 09/398,038, of Akeo Maruyama, filed Sep. 17, 1999: Specification, Claims & Figures.

(Continued)

Primary Examiner—King Y Poon
Assistant Examiner—Allen H Nguyen
(74) Attorney, Agent, or Firm—Cooper & Dunham LLP

(57) ABSTRACT

A printer server generates print data in a format dependent on a printer connected to a network, from application data to be printed out by an application. The printer server includes a processor that processes intermediate data based on an additive attribute indicating an attribute relating to the generation and security added to the intermediate data at the time of generating the intermediate data. A print data converter converts the intermediate data processed into print data in a format dependent on a printer.

19 Claims, 22 Drawing Sheets

U.S. PATENT DOCUMENTS

| | | |
|---|---|---|
| 2003/0093675 A1 | 5/2003 | Hibino et al. |
| 2003/0103221 A1* | 6/2003 | Natori .................. 358/1.9 |
| 2003/0135549 A1* | 7/2003 | Kuno et al. ............ 709/203 |
| 2004/0190067 A1* | 9/2004 | Owen .................... 358/2.1 |

FOREIGN PATENT DOCUMENTS

| | | |
|---|---|---|
| EP | 1310862 A2 | 5/2003 |
| JP | 11-184657 | 7/1999 |
| JP | 11-219265 | 8/1999 |
| JP | 11-305982 | 11/1999 |
| JP | 2000-035861 | 2/2000 |
| JP | 2000-298564 | 10/2000 |
| JP | 2001-14127 | 1/2001 |
| JP | 2001-154932 | 6/2001 |
| JP | 2002-014797 | 1/2002 |
| JP | 2002-342060 | 11/2002 |
| JP | 2003-167713 | 6/2003 |

OTHER PUBLICATIONS

Feb. 18, 2009 search report in connection with a counterpart European patent application No. 04 25 5446.

Aug. 4, 2009 Japanese official action in connection with a counterpart Japanese patent application No. 2004-255156.

* cited by examiner

| USER NAME | ACTION |
|---|---|
| USER A | NO PROCESSING |
| USER B | ADD CONFIDENTIAL STAMP |
| OTHER USERS | UNAUTHORIZED TO PRINT |

FIG.15

| USER NAME | GENERATING APPLICATION | DOCUMENT TYPE | COLOR/ MONOCHROME | SPECIFIED MODE | SPECIFIED ACTION |
|---|---|---|---|---|---|
| USER A | NOT SPECIFIED | TECHNICAL DOCUMENT | NOT SPECIFIED | NOT SPECIFIED | NO PROCESSING |
| USER B | NOT SPECIFIED | TECHNICAL DOCUMENT | NOT SPECIFIED | NOT SPECIFIED | ADD CONFIDENTIAL STAMP |
| OTHER USERS | NOT SPECIFIED | ACCOUNT | NOT SPECIFIED | NOT SPECIFIED | UNAUTHORIZED TO PRINT |
| NOT SPECIFIED | DOCUMENT APPLICATION | ACCOUNT | COLOR | NOT SPECIFIED | ADD DESIGN PATTERN |
| NOT SPECIFIED | DOCUMENT APPLICATION | ACCOUNT | MONOCHROME | NOT SPECIFIED | ADD USER NAME STAMP |
| USER A | NOT SPECIFIED | CONFIDENTIAL DOCUMENT | NOT SPECIFIED | CONFIDENTIAL LEVEL 1 | NO PROCESSING |
| USER A | NOT SPECIFIED | CONFIDENTIAL DOCUMENT | NOT SPECIFIED | CONFIDENTIAL LEVEL 2 | ADD CONFIDENTIAL STAMP |
| USER B | NOT SPECIFIED | CONFIDENTIAL DOCUMENT | NOT SPECIFIED | CONFIDENTIAL LEVEL 1 | ADD CONFIDENTIAL STAMP |
| USER B | NOT SPECIFIED | CONFIDENTIAL DOCUMENT | NOT SPECIFIED | CONFIDENTIAL LEVEL 2 | DELETE KEYWORD |
| OTHER USERS | NOT SPECIFIED | CONFIDENTIAL DOCUMENT | NOT SPECIFIED | NOT SPECIFIED | UNAUTHORIZED TO PRINT |

FIG.18

| AUTHOR NAME | USER NAME | GENERATING APPLICATION | DOCUMENT TYPE | COLOR/ MONOCHROME | SPECIFIED MODE | SPECIFIED ACTION |
|---|---|---|---|---|---|---|
| USER A | USER A | NOT SPECIFIED | CONFIDENTIAL DOCUMENT | NOT SPECIFIED | CONFIDENTIAL LEVEL 1 | NO PROCESSING |
| USER A | USER A | NOT SPECIFIED | CONFIDENTIAL DOCUMENT | NOT SPECIFIED | CONFIDENTIAL LEVEL 2 | ADD CONFIDENTIAL STAMP |
| USER A | USER B | NOT SPECIFIED | CONFIDENTIAL DOCUMENT | NOT SPECIFIED | CONFIDENTIAL LEVEL 1 | ADD CONFIDENTIAL STAMP |
| USER A | USER B | NOT SPECIFIED | CONFIDENTIAL DOCUMENT | NOT SPECIFIED | CONFIDENTIAL LEVEL 2 | DELETE KEYWORD |
| USER A | OTHER USERS | NOT SPECIFIED | CONFIDENTIAL DOCUMENT | NOT SPECIFIED | NOT SPECIFIED | UNAUTHORIZED TO PRINT |
| USER B | USER A | NOT SPECIFIED | CONFIDENTIAL DOCUMENT | NOT SPECIFIED | NOT SPECIFIED | NO PROCESSING |
| USER B | USER B | NOT SPECIFIED | CONFIDENTIAL DOCUMENT | NOT SPECIFIED | CONFIDENTIAL LEVEL 1 | ADD CONFIDENTIAL STAMP |
| USER B | USER B | NOT SPECIFIED | CONFIDENTIAL DOCUMENT | NOT SPECIFIED | CONFIDENTIAL LEVEL 2 | ADD CONFIDENTIAL STAMP |
| USER B | OTHER USERS | NOT SPECIFIED | CONFIDENTIAL DOCUMENT | NOT SPECIFIED | NOT SPECIFIED | DELETE KEYWORD |
| NOT SPECIFIED | NOT SPECIFIED | NOT SPECIFIED | CONFIDENTIAL DOCUMENT | NOT SPECIFIED | NOT SPECIFIED | ADD CONFIDENTIAL STAMP |
| NOT SPECIFIED | NOT SPECIFIED | NOT SPECIFIED | CONFIDENTIAL DOCUMENT | NOT SPECIFIED | CONFIDENTIAL LEVEL 2 | DELETE KEYWORD |

FIG.24

| KEYWORD | OUTPUT PRINTER | OUTPUT PAPER SIZE | PAPER FEED TRAY | PAPER DISCHARGE DESTINATION | TWO-SIDED/ STAPLING/ PUNCHING | SPECIFIED ACTION | |
|---|---|---|---|---|---|---|---|
| | | | | | | ADDITION PROCESSING | KEYWORD PROCESSING |
| SEIKYUU01 | ON BUSINESS PRINTER | SAME AS ORIGINAL DOCUMENT | NOT SPECIFIED | PAPER DISCHARGE BIN 2 | LEFT TWO-HOLE PUNCHING | ADD COMPANY LOGO MARK | DELETE KEYWORD |
| SEIKYUU01 | COLOR PRINTER A | REDUCE TO A4 SIZE | TRAY 1 | PAPER DISCHARGE BIN 3 | TWO-SIDED | ADD COMPANY LOGO MARK | DELETE KEYWORD |
| NOUHIN01 | ON BUSINESS PRINTER | REDUCE TO A4 SIZE | TRAY 1 | NOT SPECIFIED | UPPER LEFT STAPLING | ADD COMPANY LOGO MARK | NO PROCESSING |
| NOUHIN02 | ON BUSINESS PRINTER | SAME AS ORIGINAL DOCUMENT | NOT SPECIFIED | NOT SPECIFIED | TWO-SIDED | NO PROCESSING | NO PROCESSING |
| URIAGE01 | NOT SPECIFIED | ENLARGE TO A3 SIZE | NOT SPECIFIED | PAPER DISCHARGE BIN 1 | UPPER TWO-HOLE PUNCHING | ADD CONFIDENTIAL STAMP | CONVERT INTO "SALES" |
| URIAGE02 | NOT SPECIFIED | REDUCE TO A4 SIZE | NOT SPECIFIED | PAPER DISCHARGE BIN 3 | LEFT TWO-HOLE PUNCHING | ADD CONFIDENTIAL STAMP | CONVERT INTO "SALES" | ures.

PRINTER SERVER, CLIENT TERMINAL, IMAGE FORMING APPARATUS, PRINT DATA GENERATING METHOD, AND COMPUTER PRODUCT

CROSS-REFERENCE TO RELATED APPLICATIONS

The present document incorporates by reference the entire contents of Japanese priority documents, 2003-315845 filed in Japan on Sep. 8, 2003 and 2004-255156 filed in Japan on Sep. 2, 2004.

BACKGROUND

1. Technical Field

This disclosure relates to technology for generating print data that is independent of a printer on which it is printed.

2) Description of the Related Art

As disclosed in Japanese Patent Application Laid-Open Nos. 2000-035861 and H11-184657, a printer driver has been heretofore known generally, which generates independent data that does not depend on a printer, a so-called intermediate data, when printing is performed by generating print data unique to the printer from application data for which a print request is made by an application.

Such intermediate data is in a form independent of a printer. Accordingly, intermediate data is stored in a memory or the like of a printer server, and reusing the intermediate data to perform printing at the time of printing a document in the same application data from a client's personal computer (PC) or the like, generating a preview from the intermediate data, or combining a plurality of intermediate data to print a single document is generally performed.

Since such intermediate data is one having a property used for reprinting of document data and preview processing, in many occasions, a plurality of users use the intermediate data to perform printing.

However, if the printing result is the same for all users, when the users use the same intermediate data to perform printing, inconveniences may be caused.

For example, when the document data includes confidential information or secret information, which should not be seen by the third party, and when the secret information is directly printed out for users other than an author of the intermediate data who generates the intermediate data, by performing the initial printing, there is a possibility that printed matter including the secret information may be distributed, without the author's knowledge, thereby causing a problem in that the security of document cannot be maintained.

On the other hand, if information indicating that the printed matter includes secret information is displayed on the printed matter with respect to users other than the author of the intermediate data, it can be prevented that the user who performs printing by using the intermediate data improperly distributes the printed matter including the secret information to the third party.

Further, many of users of the intermediate data who print document data in companies are at various official positions and have various roles, and there are various types of document data, such as application document and e-mail document. Therefore, if the secret information is deleted uniformly or information indicating that the printed matter includes secret information is uniformly displayed on the printed matter, with respect to all users or all intermediate data, information necessary for the printed matter is missing, or unnecessary information may be printed, thereby causing a problem in that distribution of the printed matter becomes inconvenient.

SUMMARY

A printer server according to an aspect of this disclosure generates print data in a format dependent on a printer connected to a network, from application data to be printed out by an application. The printer server includes a processing unit that processes independent data based on additive attribute information indicating attributes relating to generation and security, wherein the independent data is data that does not depend on the printer and that is generated from the application data, and the attributes are added to the independent data when the independent data is generated; a converter that converts the independent data processed into print data in a format dependent on the printer; and a transmitter that transmits the print data to the printer.

A printer server according to another aspect of this disclosure generates print data in a format dependent on a printer connected to a network, from application data to be printed out by an application. The printer server includes a processing unit that processes independent data based on action definition information indicating an action in the processing of the independent data for each user who uses the independent data, wherein the independent data is data that does not depend on the printer and that is generated from the application data; a converter that converts the independent data processed into print data in a format dependent on the printer; and a transmitter that transmits the print data to the printer.

A printer server according to still another aspect of this disclosure generates print data in a format dependent on a printer connected to a network, from application data to be printed out by an application. The print server includes a processing unit that processes independent data based on action definition information indicating an action in the processing of the independent data for each keyword and output printer included in the independent data, wherein the independent data is data that does not depend on the printer and that is generated from the application data; a converter that converts the independent data processed into print data in a format dependent on the printer; and a transmitter that transmits the print data to the printer.

A client terminal according to still another aspect of this disclosure makes a print request for a printer connected to a network to a printer server connected to the network. The client terminal includes an independent data generating unit that generates independent data that does not depend on the printer, wherein the independent data is generated from application data; and an additive attribute adding unit that adds to the independent data additive attribute information indicating attributes relating to generation and security of the independent data.

An image forming apparatus according to still another aspect of this disclosure performs image forming processing with respect to a printer engine, upon reception of a print request from a client terminal connected to a network. The image forming apparatus includes a storage unit that stores independent data that does not depend on the printer engine, wherein the independent data is generated from application data to be printed out by an application; a processing unit that processes the independent data stored in the storage unit, based on action definition information indicating an action in the processing of the independent data, for each user who used the independent data, in response to a request from the client terminal; a converter that converts the independent data processed into print data to be printed in a format dependent on the printer engine; and a transmitter that transmits the print data to the printer engine.

An image forming apparatus according to still another aspect of this disclosure performs image forming processing with respect to a printer engine, upon reception of a print request from a client terminal connected to a network. The image forming apparatus includes a storage unit that stores independent data that does not depend on the printer engine, wherein the independent data is generated from application data to be printed out by an application; a processing unit that processes the independent data stored in the storage unit, based on action definition information indicating an action in the processing of the independent data, for each keyword and output printer included in the independent data, in response to a request from the client terminal; a converter that converts the independent data processed into print data to be printed in a format dependent on the printer engine; and a transmitter that transmits the print data to the printer engine.

A print data generating method according to still another aspect of this disclosure is a method for generating print data in a format dependent on a printer connected to a network, from application data to be printed out by an application. The print data generating method includes processing independent data based on additive attribute information indicating attributes relating to generation and security, wherein the independent data is data that does not depend on the printer and that is generated from the application data, and the attributes are added to the independent data when the independent data is generated; converting the independent data processed into print data in a format dependent on the printer; and transmitting the print data to the printer.

A print data generating method according to still another aspect of this disclosure is a method for generating print data in a format dependent on a printer connected to a network from application data to be printed out by an application. The print data generating method includes processing independent data based on action definition information indicating an action in the processing of the independent data for each user who uses the independent data, wherein the independent data is data that does not depend on the printer and that is generated from the application data; converting the independent data processed into print data in a format dependent on the printer; and transmitting the print data to the printer.

A computer-readable recording medium according to still another aspect of this disclosure stores the above computer program.

Other aspects features, and advantages are specifically set forth in or will become apparent from the following detailed description when read in conjunction with the accompanying drawings.

BRIEF DESCRIPTION OF THE DRAWINGS

FIG. 15 is an example of contents of an action definition file;

FIG. 18 is an example of the action definition file defining a specified action for each author name (user ID) of the intermediate data;

FIG. 24 is an example of contents of the action definition file according to an eighth embodiment of the present invention.

DETAILED DESCRIPTION

Exemplary embodiments of a print data generating method, a client terminal, an image forming apparatus, and a computer product according to the present invention will be explained below, with reference to the accompanying drawings.

Figure 1:
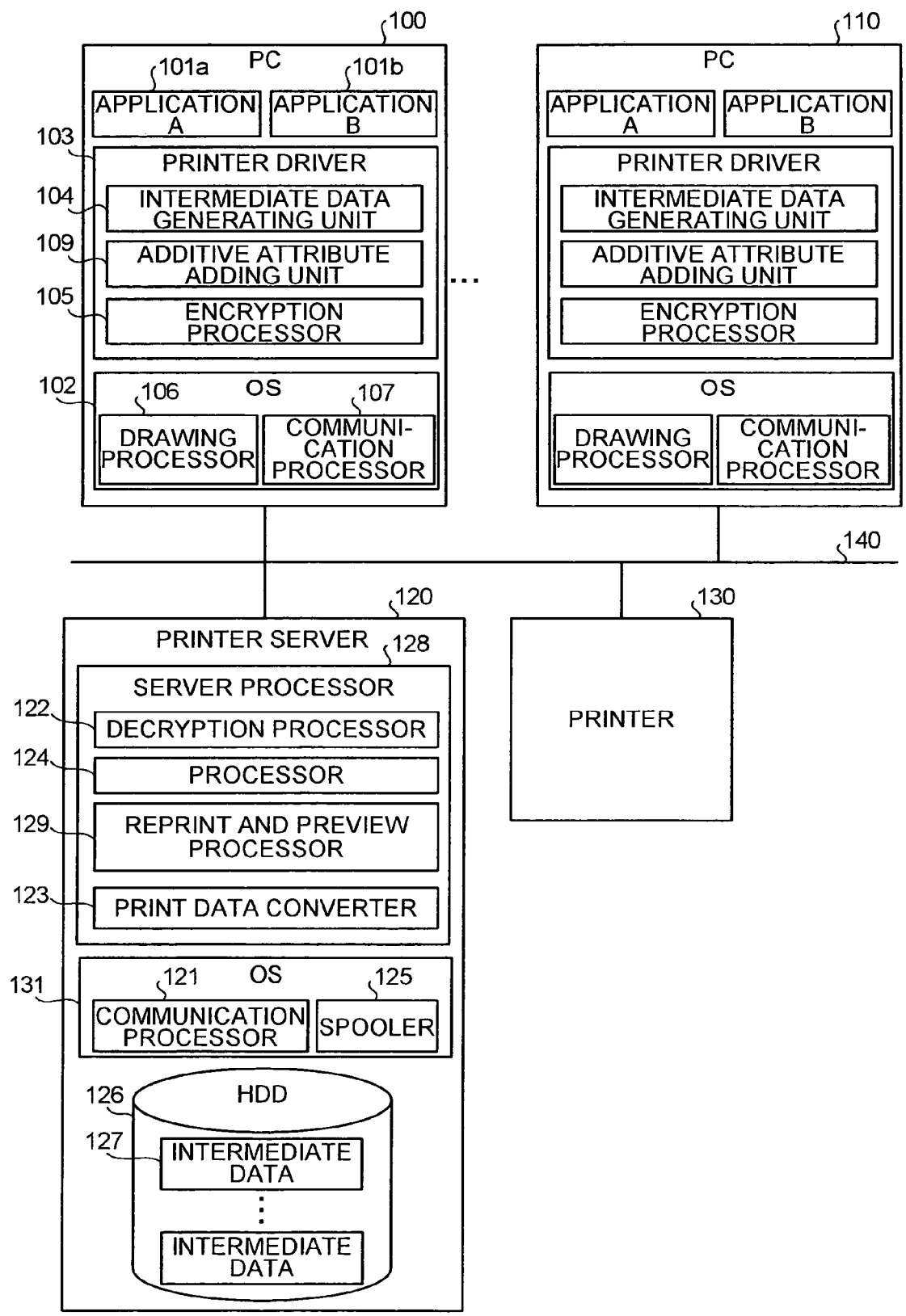
FIG. 1 is a block diagram of the network configuration and a functional structure of a printer system according to a first embodiment of the present invention.

FIG. 1 is a block diagram of a network structure and a functional structure of a printer system according to a first embodiment of the present invention.

The printer system according to the first embodiment includes plural personal computers (PCs) 100 and 110 that issue a print request of a document file generated by an application, a printer server 120 that generates print data upon reception of the print request from the PCs 100 and 110, and a printer 130 that prints the print data. The PCs 100 and 110, the printer server 120, and the printer 130 are connected to a network 140 such as Ethernet® to build up the LAN environment.

The PCs 100 and 110 are for forming a client terminal in the present invention, and mainly include an application A101a, an application B101b, an operating system (OS) 102, and a printer driver 103.

The application A101a and the application B101b respectively correspond to word processor software such as Microsoft® Word®, a document display application such as Adobe® Acrobat Reader®, or spreadsheet software such as Microsoft® Excel®. A print request generated or displayed by the application A101a or the application B101b is made from a print dialog box in the application A101a or the application B101b.

The OS 102 is a versatile OS such as Microsoft® Windows®, UNIX®, or Linux®, and has a drawing processor 106 and a communication processor 107.

The drawing processor 106 is for converting document data for which a print request has been made from the application A101a or the application B101b, into a graphic image, and when the OS 102 is Microsoft® Windows®, a graphic device interface (GDI) corresponds to the drawing processor 106.

The communication processor 107 is for controlling the equipment on the network 140 such as the printer server 120 and the printer 130, and communication by a protocol such as Transmission Control Protocol/Internet Protocol (TCP/IP).

The printer driver 103 is for operating on the OS 102, and mainly includes an intermediate data generating unit 104, an additive attribute adding unit 109, and an encryption processor 105.

The intermediate data generating unit 104 generates intermediate data independent of the printer 130 from the graphic image data generated from the document data for which the print request has been made. The intermediate data generating unit 104 constitutes an independent data generating unit in the present invention. The intermediate data corresponds to independent data in the present invention and is a general metafile for printing in a format independent of the printer 130.

A file attribute here is one for the intermediate data automatically added as a file attribute for the intermediate data under control of the OS. Specifically, it includes a user ID of a file creator of the intermediate data (that is, a user who generates the intermediate data by printing the document data for the first time), a group ID of a group to which the file creator belongs, file generating date, and file correcting date.

The additive attribute adding unit 109 is for adding an additive attribute to the intermediate data, at the time of generating the intermediate data in the present invention. The additive attribute is an attribute relating to a print job, and information used for direct action specification or action determination, and specifically, includes a generating application, being the name of application with which a print request for document data is made, at the time of generating the intermediate data, term of validity of the document, a mode specifying the confidential level indicating the importance of security, specification indicating that addition of the author name is essential, document type indicating the type of the document, or color/monochrome indication whether the document is a color or monochrome document.

However, the contents of the additive attribute are not limited thereto, and may include other pieces of information.

The encryption processor 105 encrypts the intermediate data generated by the intermediate data generating unit 104 and added with the additive attribute by the additive attribute adding unit 109, by using a cryptographic key specified by a user or the like according to a public key cryptosystem or a secret key cryptosystem, and stores the encrypted intermediate data in a hard disk drive (HDD) 126 on the printer server 120 via the communication processor 107.

The printer server 120 saves the encrypted intermediate data 127 generated by the PC 100 or 110 in the HDD 126, in response to the print request from the PC 100 or 110. Further, the printer server 120 converts the intermediate data saved in the HDD 126 into print data dependent on the printer 130, according to a reprint request or a preview request from the PC 100 or 110, and transmits the print data to the printer 130.

The printer server 120 mainly includes a server processor 128, an OS 131, and the HDD 126.

The server processor 128 performs as a server, with respect to the printer driver 103 acting on the PCs 100 and 110 as a client, to realize various functions as a printer server. The server processor 128 mainly includes a decryption processor 122, a processor 124, a reprint and preview processor 129, and a print data converter 123.

The decryption processor 122 reads the encrypted intermediate data 127 from the HDD 126 and decrypts the data by a cryptographic key. The cryptographic key is obtained by receiving it from the PC 100 or 110.

The processor 124 performs processing with respect to the intermediate data decrypted by the decryption processor 122 according to the additive attribute and file attribute included in the intermediate data. Specifically, processing such as deleting a keyword, adding a stamp, or adding an author name is carried out with respect to the intermediate data, for each user who has made a reprint request or a preview request, according to the additive attribute and the file attribute.

The reprint and preview processor 129 performs reprinting or preview processing, by using the intermediate data processed by the processor 124 in response to the request from the PC 100 or 110. Specifically, processing such as transferring the decrypted intermediate data to be reprinted to the print data converter 123, transferring single intermediate data generated by combining a plurality of decrypted intermediate data to the print data converter 123, or transmitting the decrypted intermediate data to the PC 100 or 110 having made a preview request.

The print data converter 123 converts the intermediate data decrypted by the decryption processor 122 or the intermediate data generated by the reprint and preview processor 129 into print data in a data format dependent on the printer 130. For the print data format, for example, a page description language (PDL) format can be used.

The OS 131 is, for example, a versatile OS such as Microsoft® Windows®, UNIX®, or Linux®, and the OS 131 has a spooler 125 and a communication processor 121.

The spooler 125 accumulates print data or processed print data as printer jobs, and sequentially transmits the data to the printer 130.

The communication processor 121 controls communication between equipment on the network 140 such as the PCs 100 and 110 and the printer 130 and a protocol such as TCP/IP.

The HDD 126 is for storing the intermediate data and various data, wherein folders (or directories) for storing the intermediate data build up a network file system, so that write and reference from the PCs 110 and 110 side becomes possible.

Figure 2A:
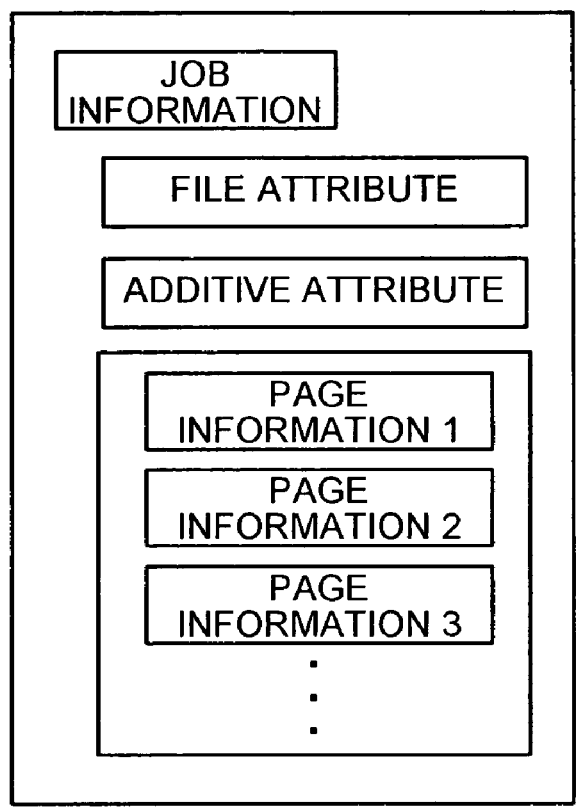
FIGS. 2A and 2B are data structures of intermediate data.
Figure 2B:
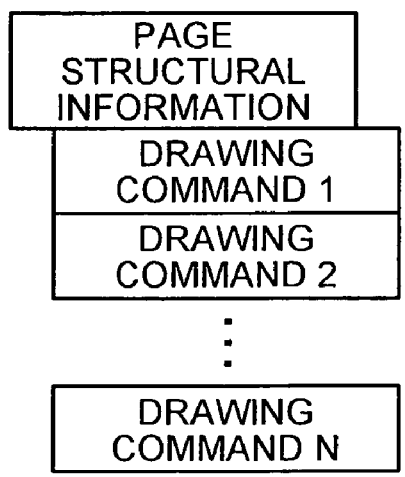

The intermediate data used in the printer systems will be explained below. FIG. 2A is a data structure diagram of the structure of the intermediate data. FIG. 2B is a data structure diagram of the intermediate data.

As shown in FIG. 2A, the intermediate data includes job information, a file attribute, an additive attribute, and one or multiple pieces of page information 1 to m. The job information includes job attribute information and encryption information relating to a print job.

The job attribute information is, for example, author name of the job, generated date of the job, job title, and size of each page in the page information. The encryption information is, for example, an encryption algorithm to be used, or a part of the cryptographic key. The page information 1 to n are the objects of encryption by the encryption processor, and the job information is not the object of encryption. The respective page information include, as shown in FIG. 2B, page structural information and one or a plurality of drawing commands 1 to n. The drawing command here is a command for drawing graphic image data generated by the drawing processor 106.

Figure 3:
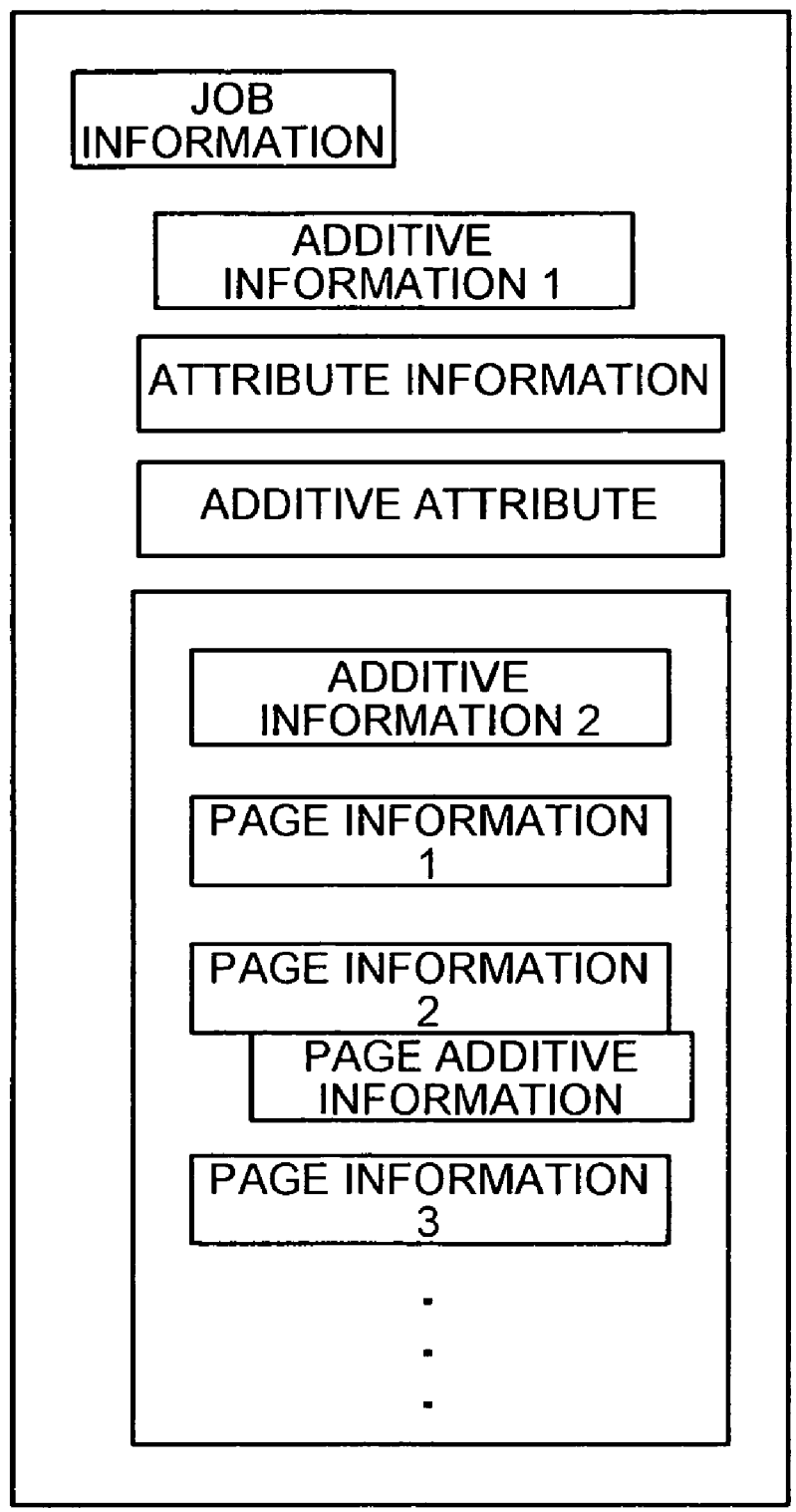
FIG. 3 is a data structure diagram of the intermediate data after manipulation by a processor.

The intermediate data is subjected to various types of processing by the processor 124, and for example, when additive information is added to the intermediate data by the processing, there are three patterns. FIG. 3 is a data structure diagram of the intermediate data after processing by the processor.

In other words, as shown in FIG. 3, there are instances when the additive information is added to the outside of the page information 1 to m, like additive information 1, when the additive information is added to the page information 1 to n at the same level like additive information 2, and when the additive information is added to the inside of the page information, like page additive information.

The PCs 100 and 110, and the printer server 120 in the first embodiment include a controller such as a CPU, a memory such as a read only memory (ROM) and a random access memory (RAM), an external memory such as a hard disk and a hard disk drive (HDD), and a CD drive, a display unit such as a display, and an input unit such as a keyboard and a mouse (any of these is not shown), which is the general configuration using a computer.

The respective computer programs of the printer driver 103 and the server processor 128 in the first embodiment are recorded on a computer readable recording medium, such as CD-ROM, flexible disk (FD), CD-R, or digital versatile disk (DVD), and provided in an installable format or an executable format.

Further, the respective computer programs of the printer driver 103 and the server processor 128 in the first embodiment may be stored on a computer connected to a network such as the Internet, and provided by downloading via the network. Further, the respective computer programs of the printer driver 103 and the server processor 128 in the first embodiment may be provided or distributed via the network such as the Internet.

The respective computer programs of the printer driver 103 and the server processor 128 in the first embodiment are loaded on a main memory by reading the computer programs from the recording medium and executing these computer programs, so that the respective parts explained in the functional configuration above are formed on the main memory.

Figure 4:
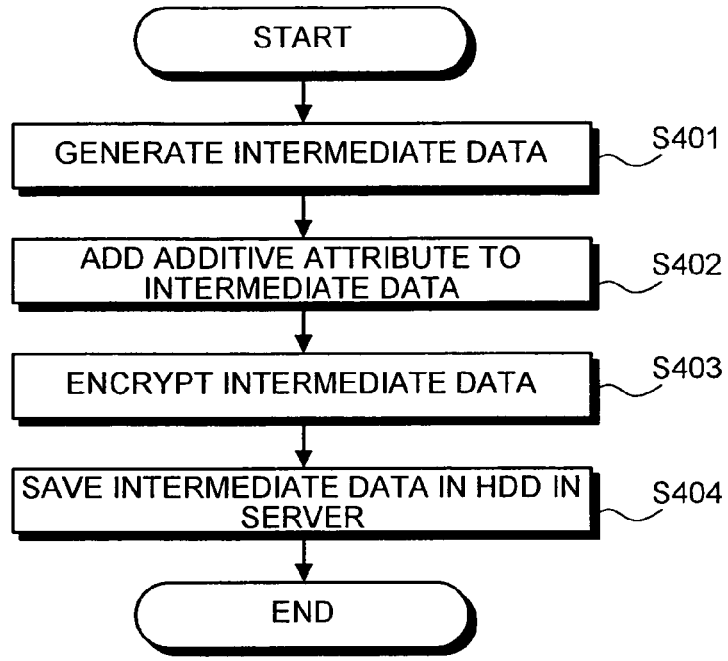
FIG. 4 is a flowchart of a generation processing for generating intermediate data by a PC shown in FIG. 1.

The generation processing and reprinting processing of the intermediate data by the printer system in the first embodiment constructed as described above will be explained below. In the first embodiment, it is assumed that the intermediate data generated by the PC 100 is used for reprinting by the PC 100 or the PC 110. FIG. 4 is a flowchart of a processing procedure for generating intermediate data by the PC 100.

When making a print request of document data generated by the application A101a or B101b, the PC 100 generates a graphic image from the document data by the drawing processor 106 in the OS 102, and generates intermediate data in a format independent of the printer 130 from the graphic image data by the intermediate data generating unit 104 (step S401).

As shown in FIG. 2, the additive attribute adding unit 109 then adds the additive attribute to the intermediate data (step S402).

The encryption processor 105 performs encryption processing with respect to the generated intermediate data, using a cryptographic key such as a public key or a secret key (step S403). The cryptographic key specified by a user of the application beforehand is used (step S404).

The encrypted intermediate data is saved in the HDD 126 in the printer server 120 via the communication processor 107 (step S404).

The intermediate data 127 saved in the HDD 126 in the printer server 120 in this manner is decrypted by the decryption processor 122 in the server processor 128, converted into print data by the print data converter 123, and transmitted to the printer 130 by the spooler 125.

Figure 5:
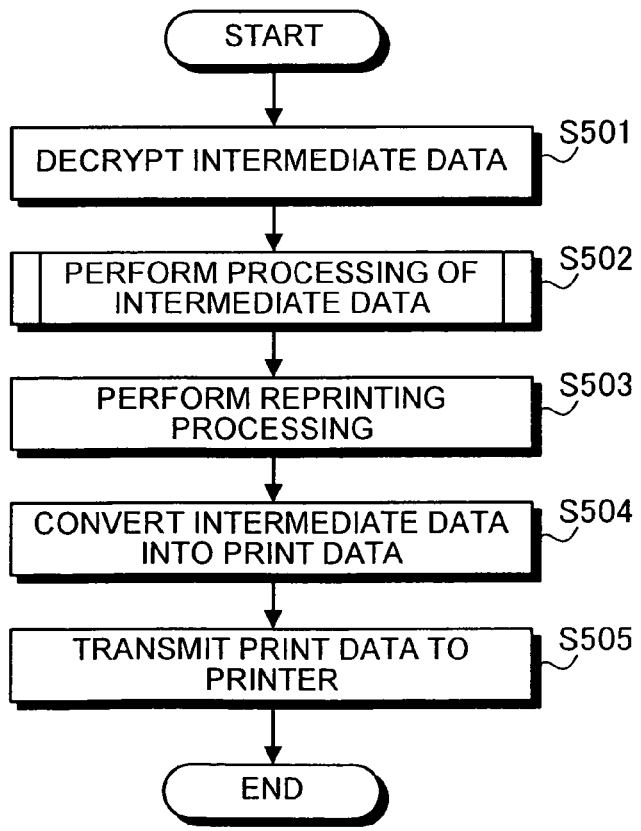
FIG. 5 is a flowchart of a procedure of reprinting processing.

The reprinting processing performed using the intermediate data 127 that is stored in the HDD 126 in the printer server 120 will be explained in detail now. FIG. 5 is a flowchart of the reprinting processing.

When a reprint request is made by the application A101a or B101b of the PC 110 to the printer server 120, the communication processor 121 receives the request, and the decryption processor 122 in the server processor 128 reads the intermediate data 127 from the HDD 126 and decrypts the read intermediate data (step S501). Thus, the intermediate data 127 to be printed is read from the HDD 126 and decrypted.

The processor 124 performs processing with respect to the decrypted intermediate data (step S502). This processing will be described in detail later.

The reprint and preview processor 129 then performs reprinting processing of the intermediate data processed by the processor 124 (step S503). Specifically, a plurality of processed intermediate data is combined to generate single intermediate data.

The intermediate data is then converted into a format dependent on the printer 130, for example, print data of a PDL format, by the print data converter 123 (step S504). The generated print data is transmitted to the printer 130 via the communication processor 121 through the network 140 by the spooler 811 (step S505).

When there is a preview request from the application A101a or B101b of the PC 110, the intermediate data decrypted at step S502 is transmitted to the PC 110 having made the request by the reprint and preview processor 129, and the application A101a or B101b of the PC 110 performs preview processing.

Figure 6:
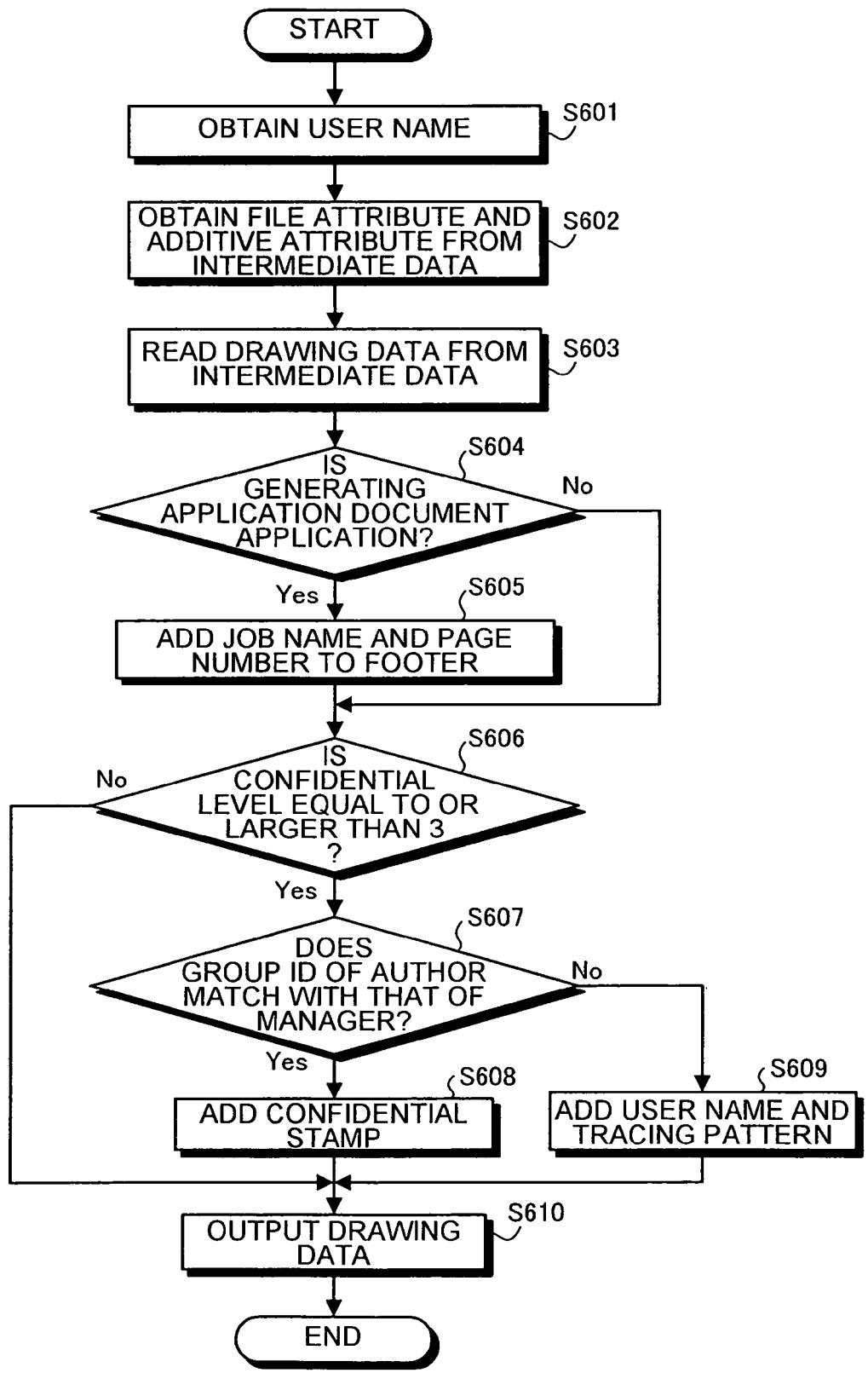
FIG. 6 is a flowchart of a processing procedure for the intermediate data performed by a processor shown in FIG. 1.

The processing of the intermediate data carried out in the processor 124 (step S502) will be explained below. FIG. 6 is a flowchart of a processing procedure for the intermediate data performed by the processor 124. In an example of this processing, different processing is performed corresponding to the contents of the file attribute and the additive attribute.

The processor 124 obtains a user ID of a user name who has made a reprint or preview request by using the intermediate data, from an author name of a job stored in the job information in the intermediate data (step S601). The processor 124 then obtains the file attribute and the additive attribute from the intermediate data (step S602), to read the drawing data (data formed of a drawing command) from the intermediate data (step S603).

Then, the processor 124 determines whether the generating application of the obtained additive attribute is a document application (step S604). When the generating application is the document application, the processor 124 adds a job name and page number of the job information to the page information corresponding to footer as additive information (step S605).

The processor 124 then determines whether the confidential level of the additive attribute obtained at step S602 is equal to or higher than 3 (step S606). When the confidential level is equal to or higher than 3, the processor 124 determines whether the group ID of the author in the file attribute is not the group ID of a manager (step S607).

When the group ID of the author matches with the group ID of the manager, the processor 124 adds a confidential stamp on the page information (step S608). On the other hand, when the group ID of the author does not matches with the group ID of the manager, the processor 124 adds the user name and a tracing pattern to the page information (step S609).

The processor 124 outputs the drawing data having processed as described (step S610) above, to transfer the data to the reprint and preview processor 129.

Figure 7:
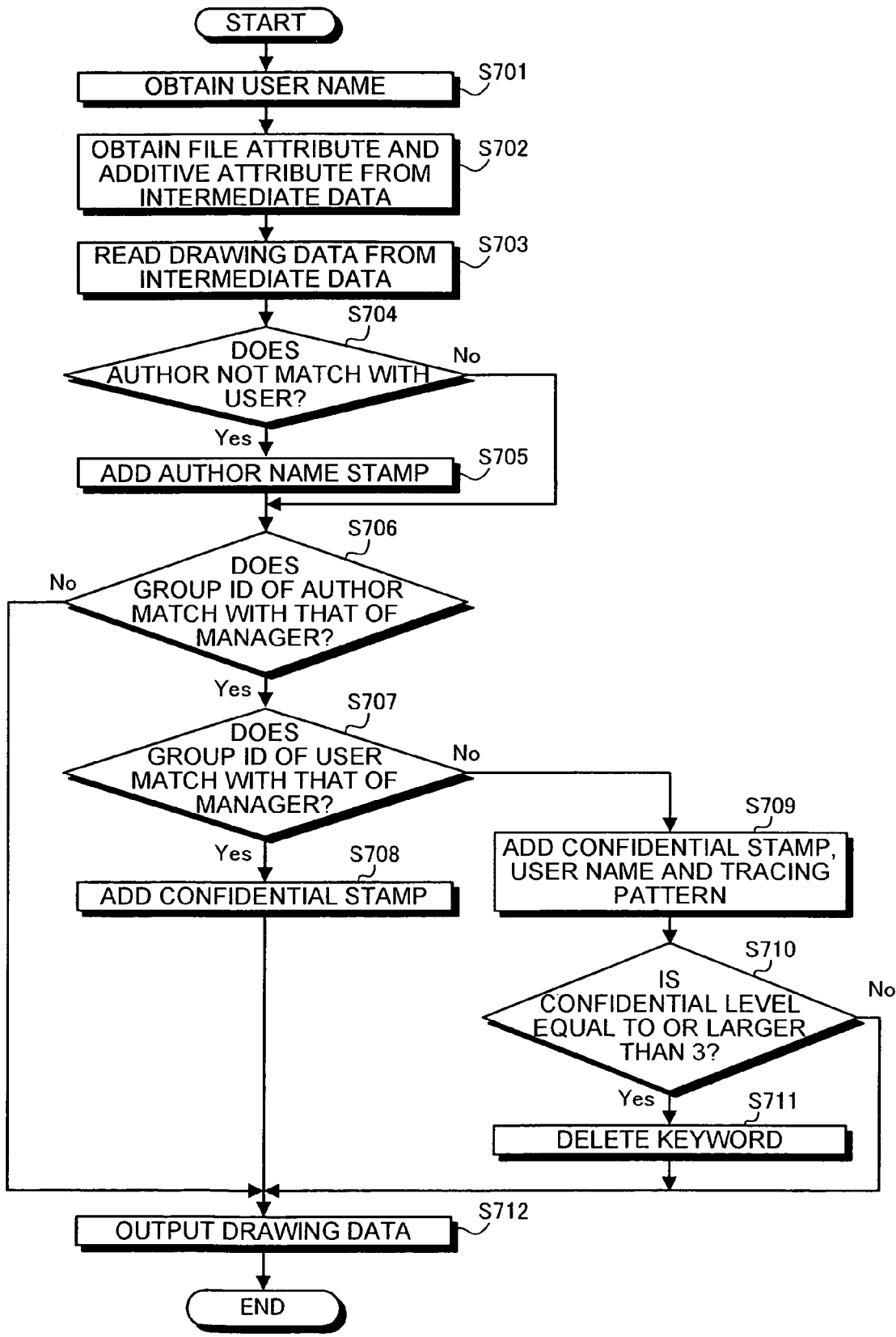
FIG. 7 is a flowchart of a procedure in an example of processing of the intermediate data performed by the processor.

The processor 124 may perform the following processing. In the following example of the processing, different processing is performed according to the user's attribute as well as the contents of the file attribute and the additive attribute. FIG. 7 is a flowchart of a procedure in a processing example of the intermediate data performed by the processor 124.

The processor 124 obtains a user ID of a user name, and the file attribute and the additive attribute from the intermediate data, and reads drawing data from the intermediate data in the same manner as in FIG. 6 (steps S701 to S703).

The processor 124 then determines whether the user ID of the author of the obtained file attribute matches with the user ID of the user (step S704). When the user ID of the author does not match with the user ID of the user, the processor 124 adds a stamp of the author name (step S705).

The processor 124 then determines whether the group ID of the author of the file attribute matches with the group ID of the manager (step S706). When the group ID of the author matches with the group ID of the manager, the processor 124 further determines whether the group ID of the user matches with the group ID of the manager from the job information (step S707).

When the group ID of the user matches with the group ID of the manager, the processor 124 performs processing for adding a confidential stamp (step S708), and outputs the processed drawing data to transfer the data to the reprint and preview processor 129 (step S712).

On the other hand, when the group ID of the user does not match with the group ID of the manager, the processor 124 performs processing for adding the confidential stamp, the user name, and the tracing pattern (step S709). The processor 124 then determines whether the confidential level of the additive attribute is equal to or higher than 3 (step S710). When the confidential level is equal to or higher than 3, the processor 124 performs processing for deleting a keyword (step S711), and outputs the processed drawing data to transfer the data to the reprint and preview processor 129 (step S712).

Figure 8A:
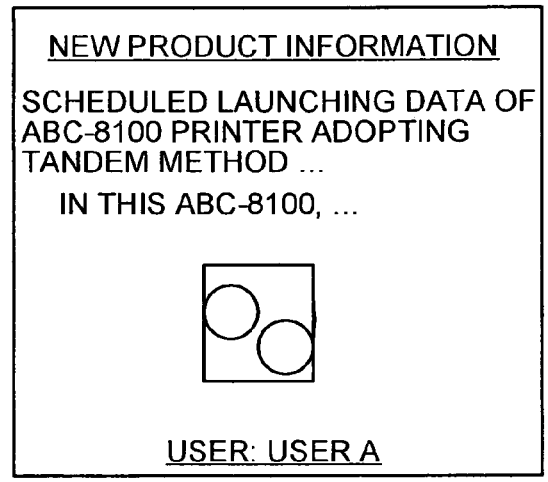
FIG. 8A is an example of a printing result when processing for adding a user name is performed with respect to the intermediate data.
Figure 8B:
FIG. 8B is an example of a printing result when processing for adding a confidential stamp is performed with respect to the intermediate data.
Figure 8C:
FIG. 8C is an example of a printing result when processing for deleting a keyword is performed with respect to the intermediate data.

An example of a printing result when the above processing is performed with respect to the intermediate data is shown below. FIG. 8A is an example of a printing result when processing for adding a user name is performed with respect to the intermediate data. FIG. 8B is an example of a printing result when processing for adding a confidential stamp is performed with respect to the intermediate data. FIG. 8C is an example of a printing result when processing for deleting a keyword is performed with respect to the intermediate data.

Thus, the printer system according to the first embodiment performs processing of the intermediate data stored in the HDD 126 in the printer server 120 based on the additive attribute, in response to a request from the PC 100 or 110. As a result, processing corresponding to the content of the attribute at the time of generating the intermediate data can be performed, and various printing results can be obtained, while performing the printing processing efficiently. Further, diversity can be given to the security level of the printed document, while efficiently performing the printing processing corresponding to the security level of the intermediate data.

The printer system according to the first embodiment determines the action in the processing according to the additive attribute added to the intermediate data. In a printer system according to a second embodiment, however, the action in the processing is determined according to action definition information in which the action in the processing is determined for each user.

Figure 9:
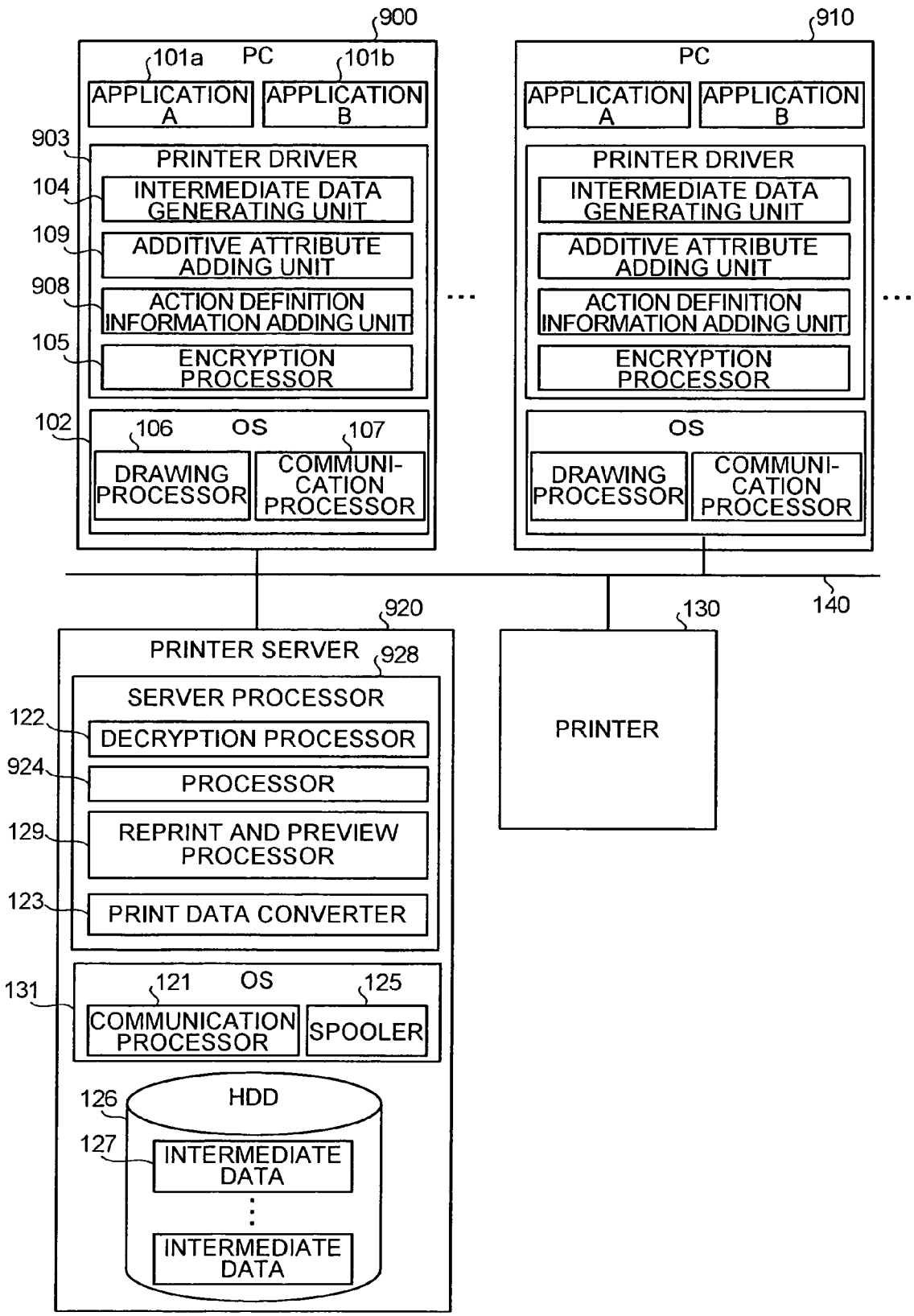
FIG. 9 is a block diagram of a network structure and a functional structure of a printer system according to a second embodiment of the present invention.

FIG. 9 is a block diagram of a network structure and a functional structure of a printer system according to the second embodiment. The printer system according to the second embodiment includes a plurality of PCs 900 and 910 that issue a print request of a document file generated by an application, a printer server 920 that generates print data upon reception of the print request from the PCs 900 and 910, and a printer 130 that prints the print data. The PCs 900 and 910, the printer server 920, and the printer 130 are connected to the network 140 such as Ethernet® to build up the LAN environment.

The PCs 900 and 910 mainly include the application A101a, the application B101b, the OS 102, and a printer driver 903.

The application A101a, the application B101b, and the OS 102 have the same functions as those in the first embodiment.

The printer driver 903 is for operating on the OS 102, and mainly includes the intermediate data generating unit 104, the additive attribute adding unit 109, an action definition information adding unit 908, and the encryption processor encryption processor 105, but is different from the printer driver 103 in the first embodiment in that it includes an action information adding unit. The intermediate data generating unit 104, the additive attribute adding unit 109, the action definition information adding unit 908, and the encryption processor 105 have the same functions as those in the first embodiment.

The action definition information adding unit 908 is for adding action definition information described later to the intermediate data generated by the intermediate data generating unit 104.

The printer server 920 saves the encrypted intermediate data 127 generated by the PC 900 or 910 in the HDD 126, in response to the print request from the PC 900 or 910. Further, the printer server 920 converts the intermediate data saved in the HDD 126 into print data dependent on the printer 130, according to a reprint request or a preview request from the PC 900 or 910, and transmits the print data to the printer 130. The printer server 920 mainly includes a server processor 928, the OS 131, and the HDD 126.

The server processor 928 performs as a server, with respect to the printer driver 903 acting on the PCs 910 and 911 as a client, to realize various functions as a printer server. The server processor 928 mainly includes the decryption processor 122, a processor 924, the reprint and preview processor 129, and the print data converter 123. The decryption processor 122, the reprint and preview processor 129, and the print data converter 123 have the same functions as those in the first embodiment.

The processor 924 performs processing with respect to the intermediate data 127 decrypted by the decryption processor 122 for each print job according to the content included in the action definition information included in the intermediate data 127. Specifically, processing such as deleting a keyword, adding a stamp, or adding an author name is carried out with respect to the intermediate data 127, for each user who has made a reprint request or a preview request, according to the action definition information.

Figures 10, 11:
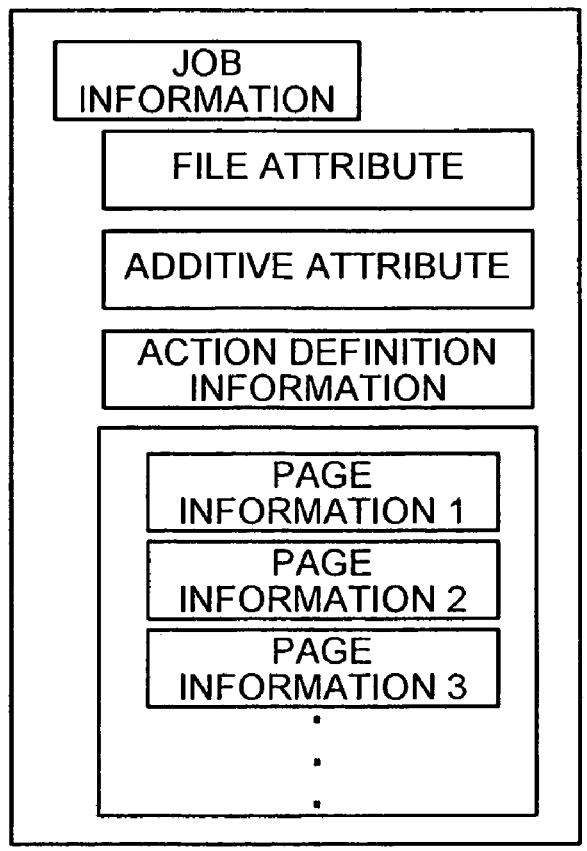
FIG. 10 is a data structure diagram of the intermediate data.
FIG. 11 is an example of action definition information.

FIG. 10 is a data structure diagram of the intermediate data in the second embodiment. The intermediate data in the second embodiment includes the action definition information in addition to the job information, file attribute, additive attribute, and page information as in the first embodiment.

FIG. 11 is an example of the action definition information. The action definition information is in a table format as shown in FIG. 11, and the action in the processing is set for each user name (user ID).

Figure 12:
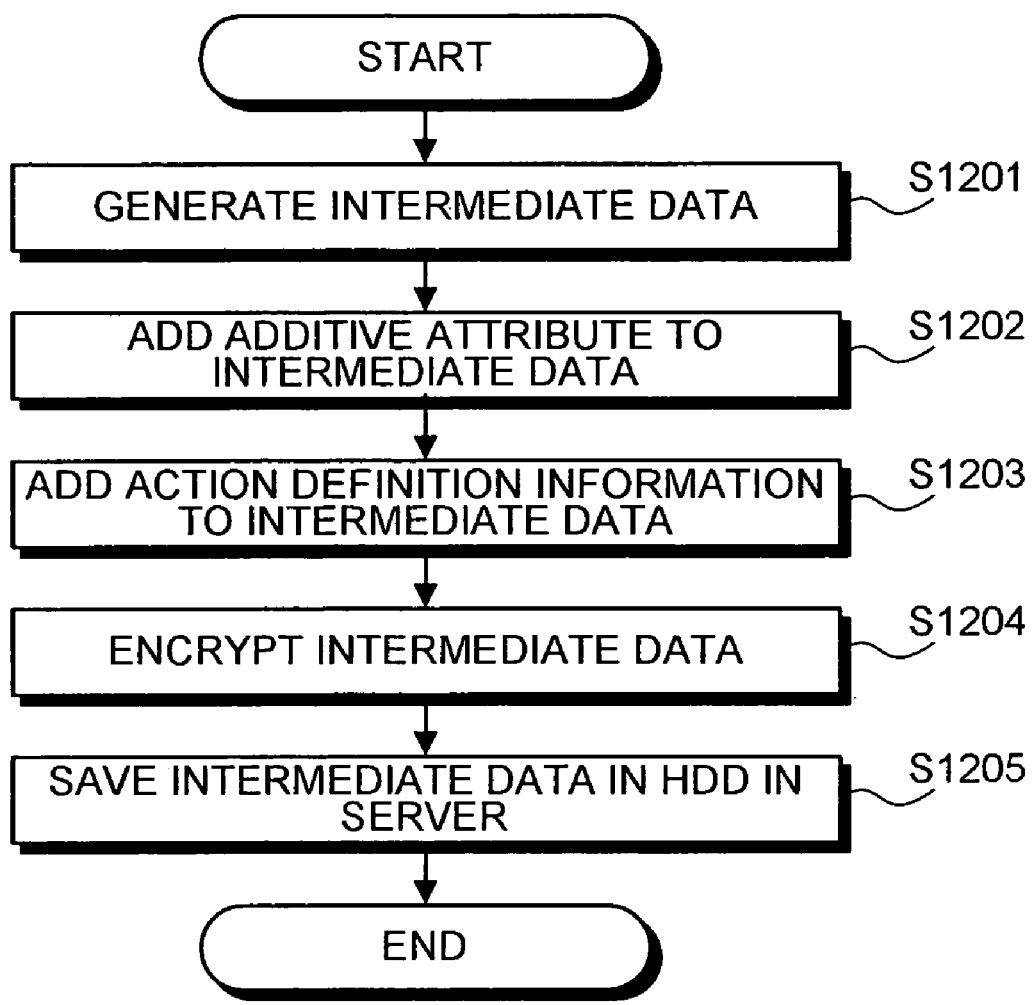
FIG. 12 is a flowchart of a processing procedure for generating intermediate data by a PC shown in FIG. 9.

Generation processing and reprinting processing of the intermediate data by the printer system according to the second embodiment, constructed as described above, will be explained below. In the second embodiment, it is assumed that the intermediate data generated by the PC 900 is used for reprinting by the PC 900 or 910. FIG. 12 is a flowchart of a processing procedure for generating the intermediate data by the PC 900.

When a print request of document data generated by the application A101a or B101b is made, the PC 900 generates the intermediate data in a format independent of the printer 130 by the intermediate data generating unit intermediate data generating unit 104, as in the first embodiment (step S1201), and the additive attribute adding unit 109 adds the additive attribute to the intermediate data (step S1202).

The action definition information adding unit 908 then adds the action definition information as shown in FIG. 11 to the intermediate data (step S1203). The action definition information is generated for each print job, and added to the intermediate data. The content of the action definition information may be determined optionally for each print job, or may be set so as to have a different pattern for each print job by preparing a plurality of patterns of specified action for each user beforehand.

As in the first embodiment, the encryption processor 105 performs encryption processing with respect to the generated intermediate data, using a cryptographic key such as a public key or a secret key (step S1204), and saved in the HDD 126 of the printer server 120 via the communication processor 107 (step S1205).

Figure 13:
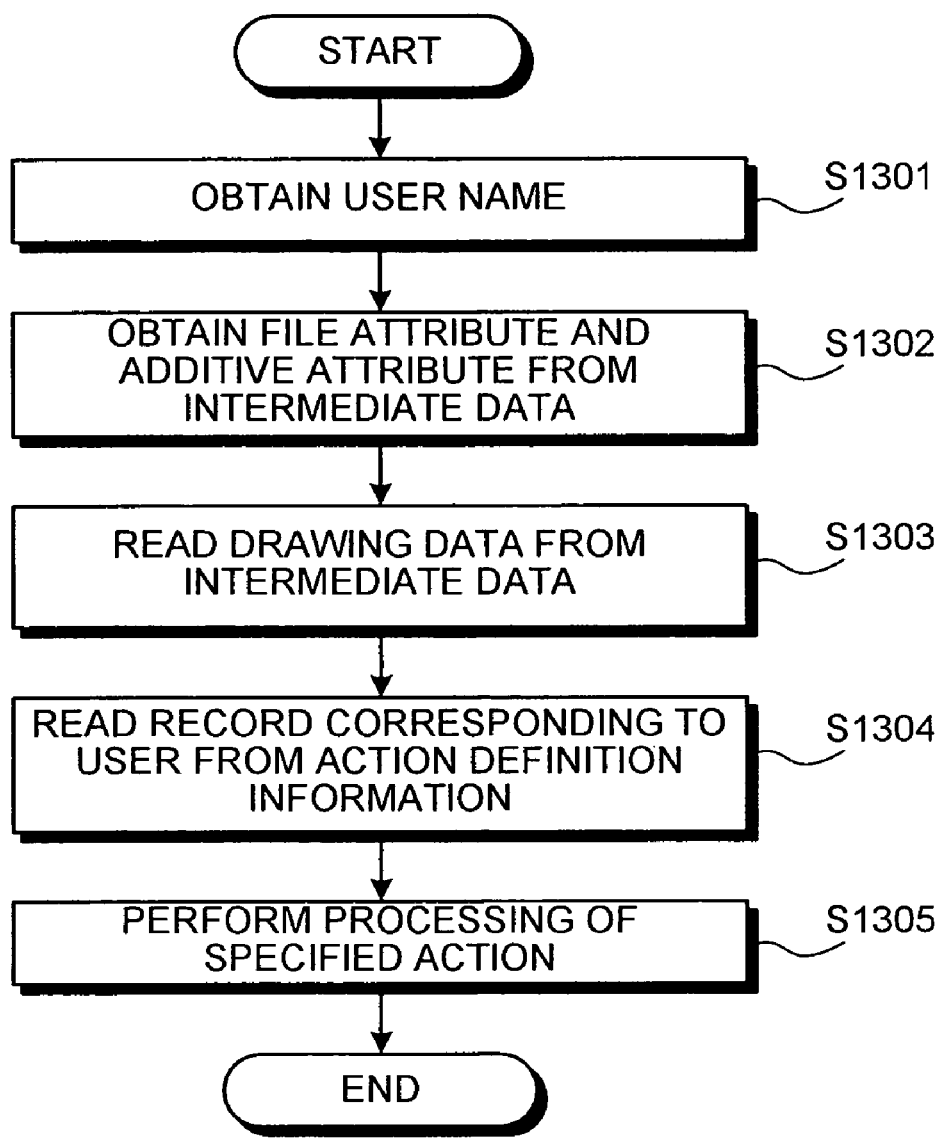
FIG. 13 is a flowchart of a processing procedure for the intermediate data performed by a processor shown in FIG. 9.

The processing of the intermediate data carried out in the processor 924 in the printer server 920 will be explained below. FIG. 13 is a flowchart of a processing procedure for the intermediate data performed by the processor 924.

The processor 924 obtains a user ID of a user name who has made a reprint or preview request by using the intermediate data, from an author name of a job stored in the job information in the intermediate data (step S1301). The processor 924 then obtains the file attribute and the additive attribute from the intermediate data (step S1302), to read the drawing data (data formed of a drawing command) from the intermediate data (step S1303).

Then, the processor 924 reads a record corresponding to the user ID of the user obtained at step S1301 from the action definition information (step S1304), to perform processing of the corresponding specified action (step S1305). In the example shown in FIG. 11, when the user is user A, the processing is not performed, when the user is user B, processing for adding a confidential stamp is performed, and when the user is another user other than the users A and B, printing processing is not carried out.

Thus, in the printer system in the second embodiment, since the processing is performed with respect to the intermediate data based on the action definition information indicating the action in the intermediate data processing, for each user who uses the intermediate data, processing of the intermediate data different for each user of the intermediate data can be performed. As a result, various printing results can be obtained, while efficiently performing the printing processing.

In the printer system in the second embodiment, since the processing is performed with respect to the intermediate data based on the action definition information for each print job included in the intermediate data, processing of the intermediate data different for each user and for each print job can be performed. As a result, various printing results can be obtained, while efficiently performing the printing processing.

In the printer system according to the second embodiment, the action in the intermediate data processing is determined for each print job according to the action definition information in the intermediate data. According to a third embodiment, however, a single action definition file is stored beforehand in the printer server, and the content of the processing is determined according to the action definition file.

Figure 14:
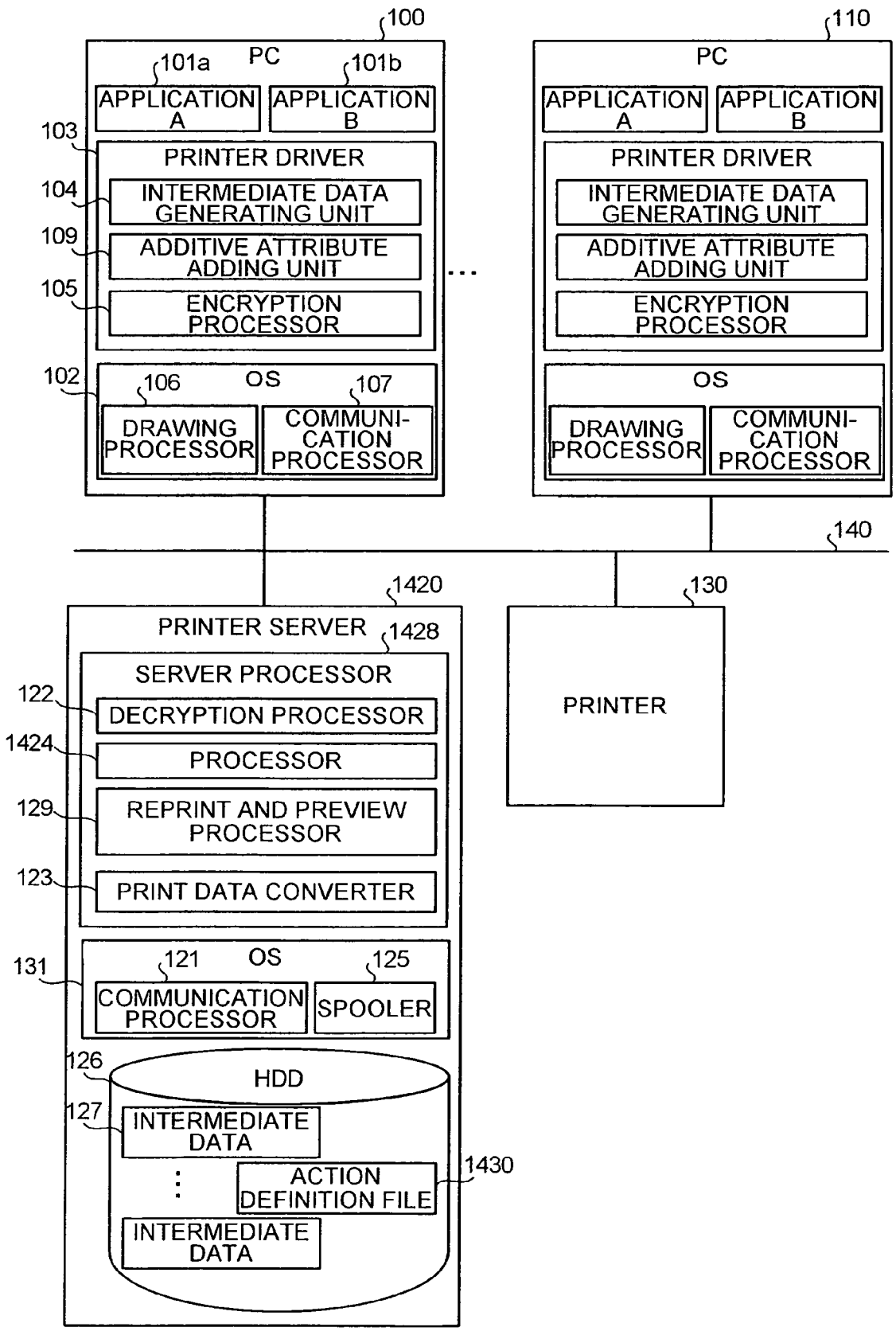
FIG. 14 is a block diagram of a network structure and a functional structure of a printer system according to a third embodiment of the present invention.

FIG. 14 is a block diagram of a network structure and a functional structure of a printer system according to the third embodiment.

The printer system according to the third embodiment includes a plurality of PCs 100 and 110 that issue a print request of a document file generated by an application, a printer server 1420 that generates print data upon reception of the print request from the PCs 100 and 110, and a printer 130 that prints the print data. The PCs 100 and 110, the printer server 120, and the printer 130 are connected to the network 140 such as Ethernet® to build up the LAN environment.

The PCs 100 and 110 have the same configuration as that of the PCs in the first embodiment, and the generated intermediate data has the same structure as that of the intermediate data in the first embodiment.

The printer server 1420 saves the encrypted intermediate data 127 generated by the PC 100 or 110 in the HDD 126, in response to the print request from the PC 100 or 110. Further, the printer server 1420 converts the intermediate data 127 saved in the HDD 126 into print data dependent on the printer 130, according to a reprint request or a preview request from the PC 100 or 110, and transmits the print data to the printer 130. The printer server 1420 mainly includes a server processor 1428, the OS 131, and the HDD 126.

The server processor 1428 performs as a server, with respect to the printer driver 103 acting on the PCs 100 and 110 as a client, to realize various functions as a printer server. The server processor 1428 mainly includes the decryption processor 122, a processor 1424, the reprint and preview processor 129, and the print data converter 123. The decryption processor 122, the reprint and preview processor 129, and the print data converter 123 have the same functions as those in the first embodiment.

The processor 1424 performs processing with respect to the intermediate data decrypted by the decryption processor 122 according to the content of an action definition file 1430 stored in the HDD 126. Specifically, processing such as deleting a keyword, adding a stamp, or adding an author name is carried out with respect to the intermediate data 127, for each user who has made a reprint request or a preview request, according to the action definition file 1430.

The HDD 126 stores the action definition file 1430, in addition to the intermediate data 127 and various data as with the printer server 120 in the first embodiment. In the case of the HDD 126, folders (or directories) for storing the intermediate data build up a network file system, so that write and reference from the PCs 110 and 110 side becomes possible.

The action definition file 1430 is a data file in which user IDs of user names, generating applications, document types, color specification, and specified actions (contents) in the processing corresponding to the specified mode are defined for each user of the intermediate data, when reprinting or preview processing is performed by using the intermediate data 127. FIG. 15 is an example of contents of the action definition file.

The action definition file 1430 is, as shown in FIG. 15, in a table format, and respective attributes of user name (user ID), generating application, document type, color/monochrome, specified mode, and specified action are set.

The generating application is an application name, which has generated the intermediate data at the time of initial printing of the document. The document type denotes the type of document, being the source of the intermediate data, such as a technical document, a confidential document, or a bill. The color/monochrome indicates whether the document, being the source of the intermediate data, is a color document or a monochrome document. The specified mode indicates the confidential level of the document. The generating application, document type, color/monochrome, and the specified mode are all included in the additive attribute in the intermediate data. The user name denotes a creator of the job in the job information in the intermediate data.

Figure 16:
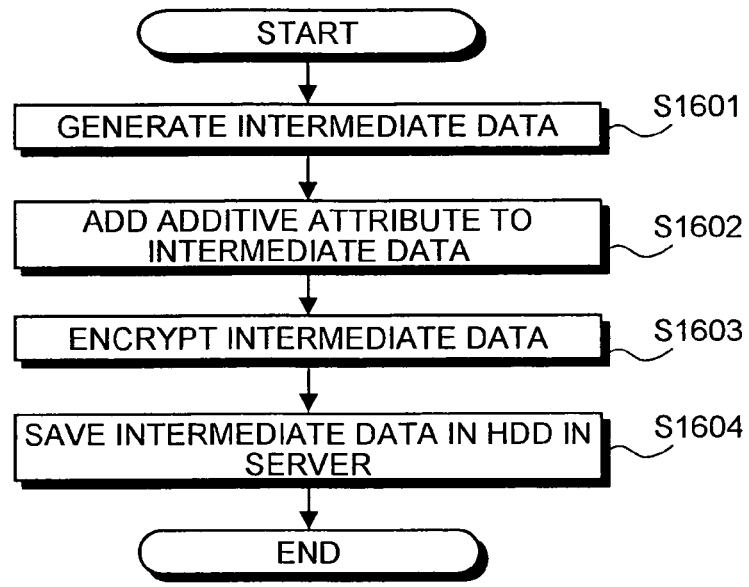
FIG. 16 is a flowchart of a processing procedure for generating intermediate data by a PC shown in FIG. 14.

The generation processing and the reprinting processing of the intermediate data by the printer system in the third embodiment constructed as described above will now be explained. In the third embodiment, it is assumed that the intermediate data generated by the PC 100 is used for reprinting by the PC 100 or the PC 110. FIG. 16 is a flowchart of a processing procedure for generating intermediate data by the PC 100.

As in the first embodiment, when making a print request of document data generated by the application A101a or B101b, the PC 100 generates intermediate data in a format independent of the printer 130 (step S1601).

The additive attribute adding unit 109 then adds the additive attribute to the intermediate data (step S1602).

The encryption processor 105 then performs encryption processing with respect to the generated intermediate data, using a cryptographic key such as a public key or a secret key (step S1603).

The encrypted intermediate data is saved in the HDD 126 in the printer server 120 via the communication processor 107 (step S1604).

Figure 17:
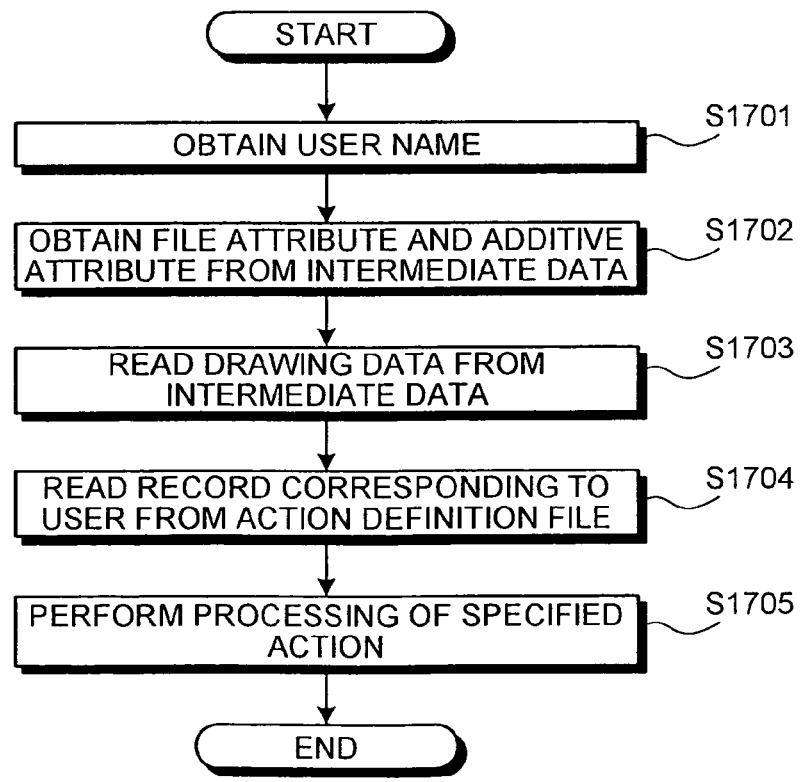
FIG. 17 is a flowchart of a processing procedure for the intermediate data performed by a processor shown in FIG. 14.

The processing of the intermediate data performed in the processor 1424 in the printer server 1420 will now be explained. FIG. 17 is a flowchart of a processing procedure for the intermediate data performed by the processor 1424.

At first, the processor 1424 obtains a user ID of a user who has made a reprint or preview request by using the intermediate data, from the author name of a job stored in the job information in the intermediate data (step S1701). The processor 1424 then obtains the file attribute and the additive attribute from the intermediate data (step S1702), to read the drawing data (data formed of a drawing command) from the intermediate data (step S1703).

Then, the processor 1424 reads a record corresponding to the user ID of the user obtained at step S1701, from the action definition file 1430 stored in the HDD 126 (step S1704), to perform processing of the corresponding specified action (step S1705). For example, in the example in FIG. 15, when a user is user A, and performs reprinting or the like by using the intermediate data showing from the additive attribute that the document type is a confidential document and the specified mode is confidential level 2, a confidential stamp is added as the processing.

A specified action here may be defined for each author name (user ID) that has generated the intermediate data in the action definition file 1430, by performing the initial printing of the document data.

FIG. 18 is an example of the action definition file defining a specified action for each author name (user ID) of the intermediate data.

In the printer system according to the third embodiment, processing according to the action definition file is performed with respect to the intermediate data stored in the HDD 126 in the printer server 1420, in response to a request from the PC 100 or 110. As a result, various printing results can be obtained, and efficient printing processing can be performed by using the intermediate data, with diversity given to the security level of the printed document.

In the printer system according to the third embodiment, since processing is performed with respect to the intermediate data based on the action definition file 127 stored in the HDD 126 in the printer server 1420, processing corresponding to the user and the attribute of the intermediate data can be centrally managed and realized in the printer server 1420.

The printer system according to the third embodiment determines the action in the processing according to the action definition file 1430 stored in the HDD 126 in the printer server 1420. A printer system according to a fourth embodiment, however, determines the action in the processing according to an action definition file stored beforehand in the information server on the network.

Figure 19:
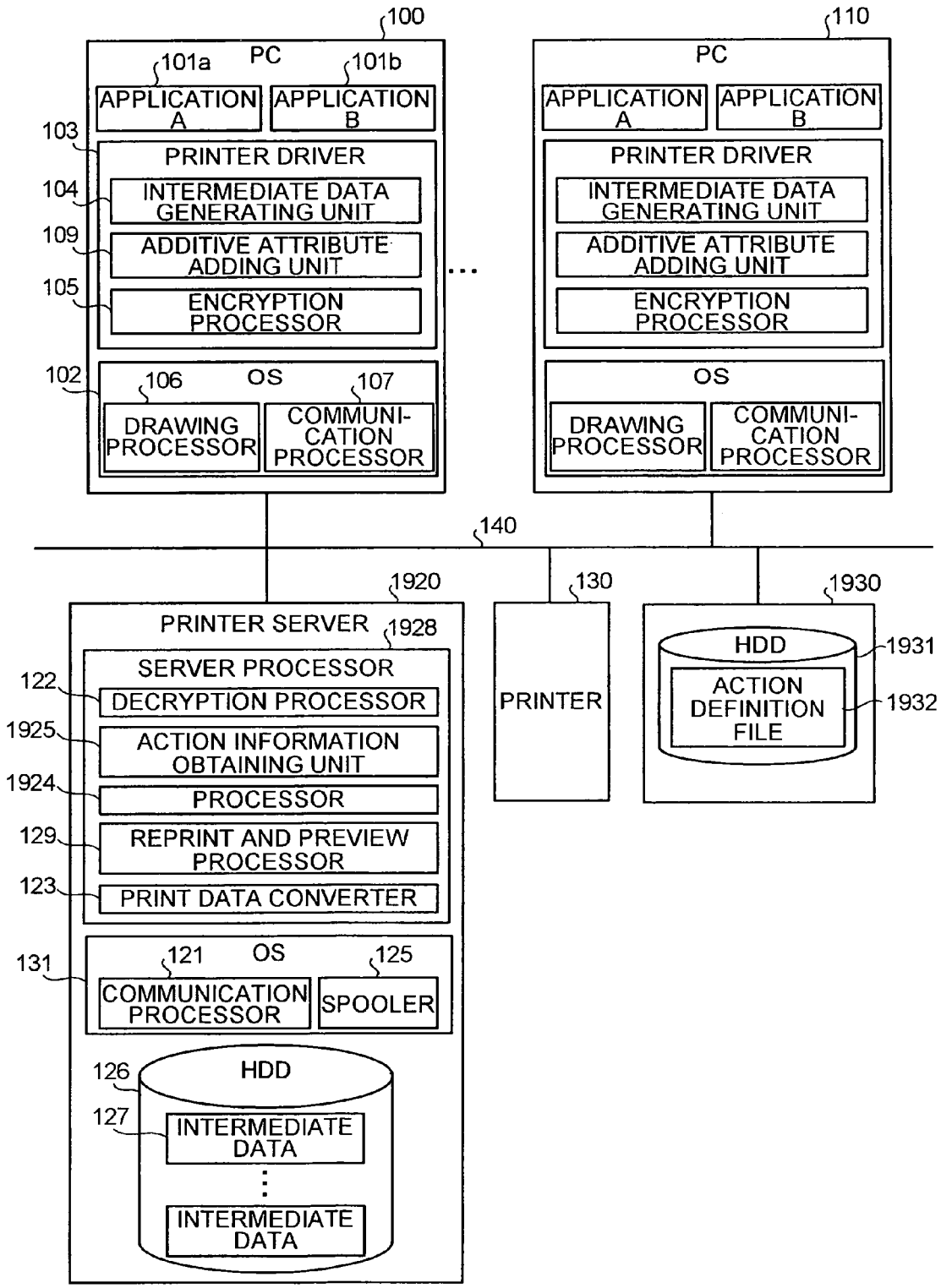
FIG. 19 is a block diagram of a network structure and a functional structure of a printer system according to a fourth embodiment of the present invention.

FIG. 19 is a block diagram of a network structure and a functional structure of a printer system according to the fourth embodiment.

The printer system according to the fourth embodiment includes a plurality of PCs 100 and 110 that issue a print request of a document file generated by an application, a printer server 1920 that generates print data upon reception of the print request from the PCs 100 and 110, a printer 130 that prints the print data, and an information server 1930 holding an action definition file 1932. The PCs 100 and 110, the printer server 1920, the printer 130, and the information server 1930 are connected to the network 140 such as Ethernet® to build up the LAN environment. The information server 1930 may have a configuration in which the PCs 100 and 110, the printer server 1920, and the printer 130 are connected via the Internet.

The PCs 100 and 110 mainly include the application A101a, the application B101b, the OS 102, and the printer driver 103, and the configuration of the PCs 100 and 110 is the same as that of the second embodiment.

The printer server 1920 saves the encrypted intermediate data 127 generated by the PC 100 or 110 in the HDD 126, in response to the print request from the PC 100 or 110. The printer server 1920 converts the intermediate data saved in the HDD 126 into print data dependent on the printer 130, according to a reprint request or a preview request from the PC 100 or 110, and transmits the print data to the printer 130.

The printer server 1920 mainly includes a server processor 1928, the OS 131, and the HDD 126.

The server processor 1928 performs as a server, with respect to the printer driver 103 acting on the PCs 100 and 110 as a client, to realize various functions as a printer server. The server processor 1928 mainly includes the decryption processor 122, an action information obtaining unit 1925, a processor 1924, the reprint and preview processor 129, and the print data converter 123. The decryption processor 122, the reprint and preview processor 129, and the print data converter 123 have the same functions as those in the first embodiment.

The action information obtaining unit 1925 accesses the information server 1930 connected to the network, and receives an action definition file 1932 from the information server 1930. The action definition file 1932 here is saved in the HDD 1932 in the information server 1930 for each user of the intermediate data, and can be accessed by specifying a Uniform Resource Locator (URL) preset in the printer server 1420.

The structure of the action definition file 1932 is the same as that of the third embodiment, and user IDs of users of the intermediate data uniquely determined on the network are registered in the user name. For example, even if the PC 100 and the PC 110 have the same user name, the user ID is different. That is, even if the name of the user on the PC 100 and the name of the user on the PC 110 are both User A, the user on the PC 100 is registered in the user name in the action definition file as UserA@pc100, and the user on the PC 110 as UserA@pc110, different from each other.

The processor 1924 performs processing with respect to the intermediate data decrypted by the decryption processor 122, according to the content of the action definition file 1932 obtained by the action information obtaining unit 1925. Specifically, processing such as deleting a keyword, adding a stamp, or adding an author name is carried out with respect to the intermediate data, for each user who has made a reprint request or a preview request, according to the action definition file 1932.

The HDD 126 stores the intermediate data and various data, as in the printer server 120 in the first embodiment. In the fourth embodiment, to receive the action definition file 1932 from the information server 1930 and use it, the action definition file is not stored in the HDD 126, different from the printer server 1020 in the third embodiment. Also in this HDD 126, folders (or directories) for storing the intermediate data build up a network file system, so that write and reference from the PCs 110 and 110 side becomes possible, as in the first embodiment.

The information server 1930 includes an HDD 1931, and the action definition file 1932 is stored in the HDD 1931. The URL of the information server 1930 is preset in a memory such as RAM in the printer server 1920.

The action definition file 1932 is a data file in which the content of the processing is defined according to a name of user and the attribute of the intermediate data 1029 for each user, at the time of using the intermediate data 127, and the structure and the content are the same as those of the action definition file explained in the third embodiment.

In the printer system in the fourth embodiment, as in the third embodiment, the intermediate data is generated and encrypted by the printer driver 103 in the PC 100 or 110, and saved in the HDD 126 in the printer server 1920. The intermediate data 127 generated by the PC 100 or 110 in the fourth embodiment has the same data structure as that of the intermediate data in the third embodiment, and the action definition information is not added thereto.

The flow in the reprinting processing by the printer server 1920 in the fourth embodiment is the same as in the first embodiment.

Figure 20:
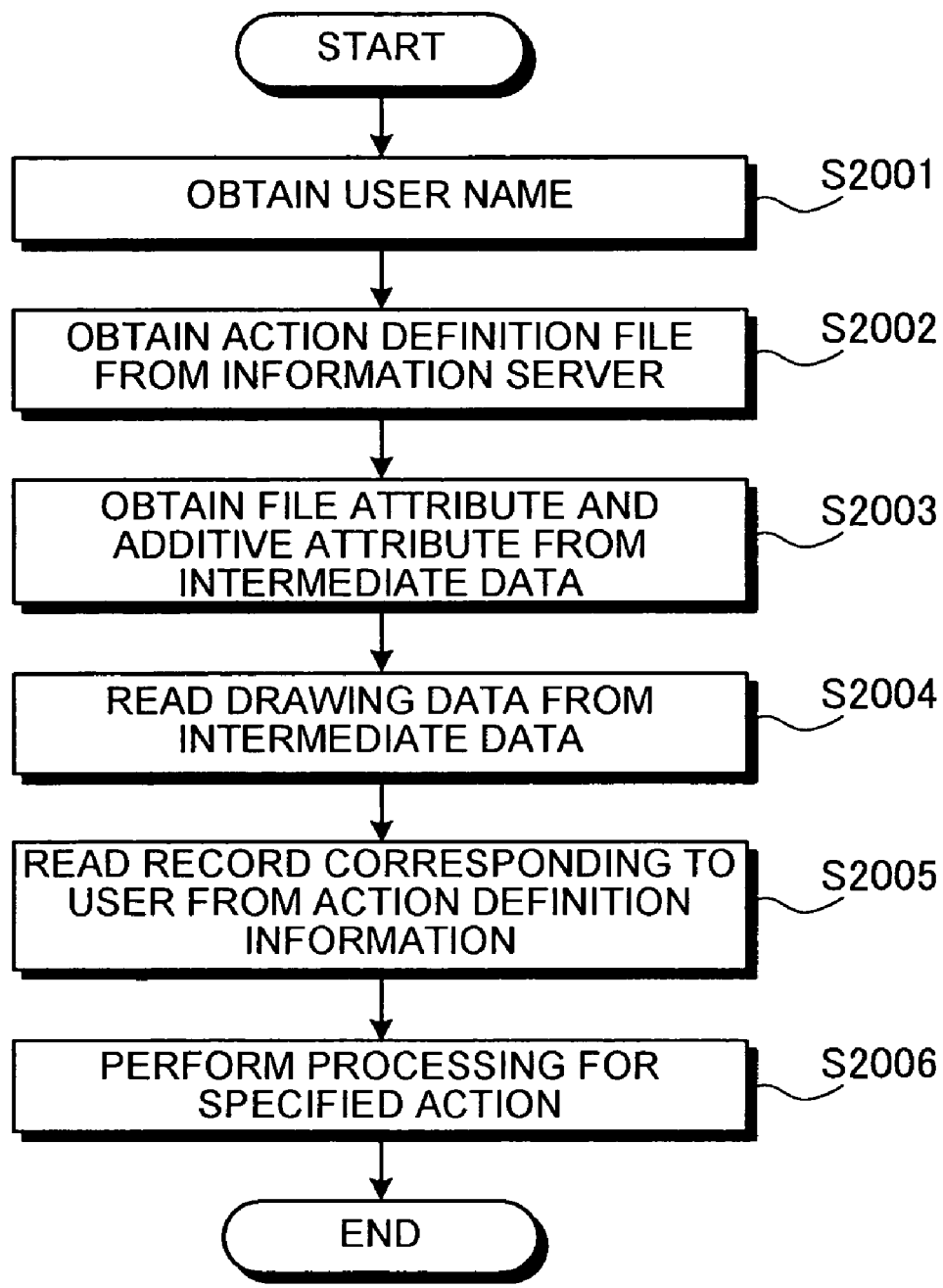
FIG. 20 is a flowchart of a processing procedure for intermediate data performed by a processor shown in FIG. 19.

The processing of the intermediate data 127 by the processor 1924, performed in the reprinting processing by the printer server 1920 will be explained. FIG. 20 is a flowchart of a processing procedure for intermediate data 127 performed by the processor 1924.

The processor 1924 first obtains a user ID of a user who has made a reprint or preview request by using the intermediate data, from an author name of a job stored in the job information in the intermediate data (step S2001).

The action information obtaining unit 1925 then accesses the information server 1930 on the network, to receive and obtain the action definition file 1432 from the HDD 1431 in the information server 1930 (step S2002).

Then, the action information obtaining unit 1925 obtains the file attribute and the additive attribute from the intermediate data (step S2003), to read the drawing data (data formed of a drawing command) from the intermediate data (step S2004).

The action information obtaining unit 1925 then reads a record corresponding to the user ID of the user obtained from the action definition file 1932 stored in the HDD 126 at step S2001 (step S2005). At this time, the action information obtaining unit 1925 searches the relevant record, using the UserA@pc100 or the like as the user ID of the user, from the name of the user obtained at step S2001 and the PC name from which the reprint or preview request has been made. Then processing for the corresponding specified action is then performed (step S2006). A specific processing example is the same as in the third embodiment.

Thus, in the printer system according to the fourth embodiment, processing is performed with respect to the intermediate data stored in the HDD 126 in the printer server 1920, based on the action definition file 1932 obtained from the information server 1930 on the network, in response to a request from the PC 100 or 110. As a result, various printing results can be obtained, and efficient printing processing can be performed by using the intermediate data, with diversity given to the security level of the printed document.

Further, in the printer system according to the fourth embodiment, since the action definition file 1932 is received from the information server 1930 on the network, and processing is performed with respect to the intermediate data based on the received action definition file 1932, processing corresponding to the user and the attribute of the intermediate data can be centrally managed and realized in the network.

The printer systems according to the first to the fourth embodiments include a printer server, with respect to the PC as a client, and a printer. A printer system according to a fifth embodiment, however, includes a multifunction product having a server function, and the multifunction product performs processing of the intermediate data, without using the printer server.

Figure 21:
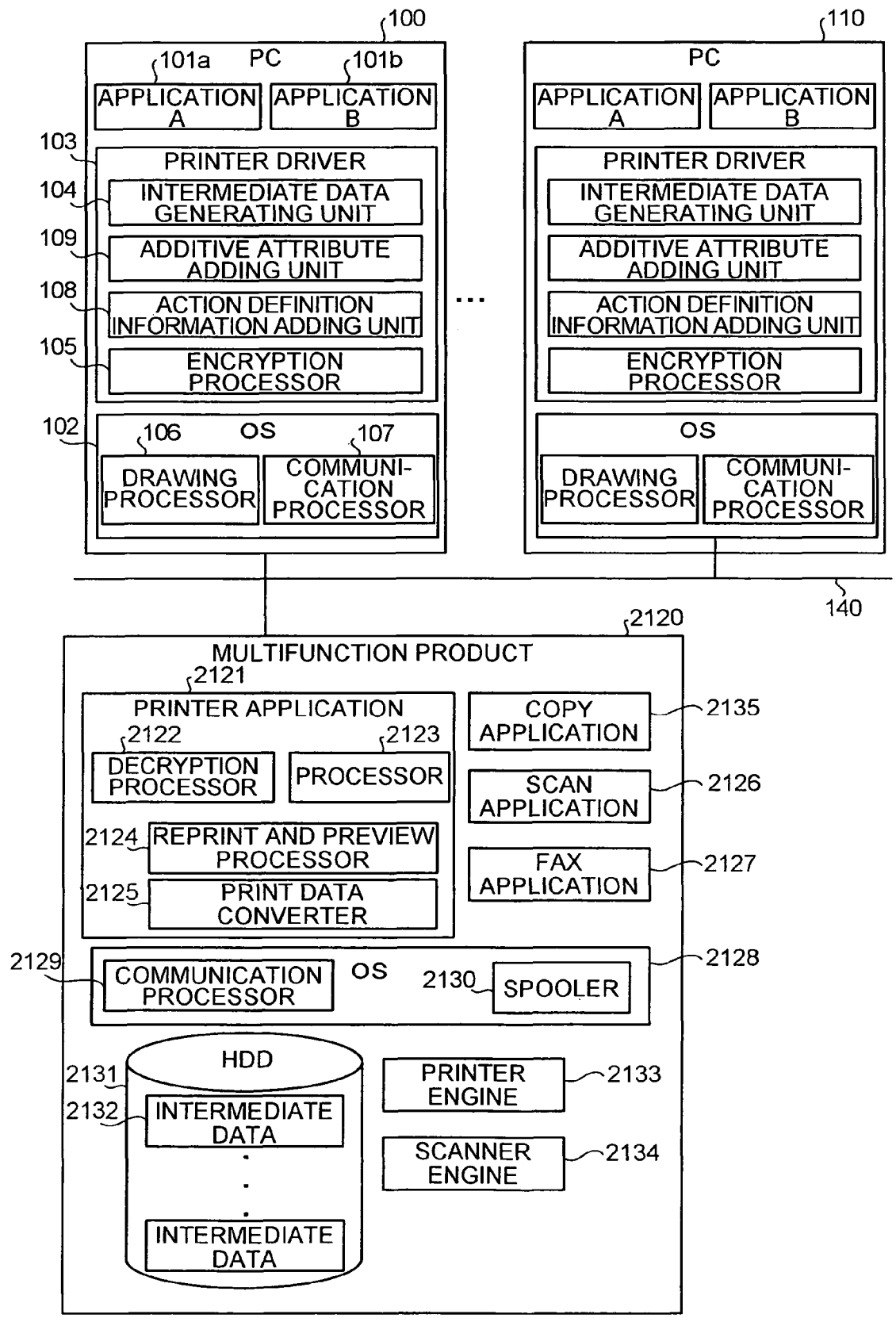
FIG. 21 is a block diagram of a network structure and a functional structure of a printer system according to a fifth embodiment of the present invention.

FIG. 21 is a block diagram of a network structure and a functional structure of a printer system according to the fifth embodiment.

The printer system according to the fifth embodiment includes a plurality of PCs 100 and 110 that issue a print request of a document file generated by the application A101a or B101b, and a multifunction product 2120 that generates print data upon reception of the print request from the PC 100 or 110 and prints the print data. The PCs 100 and 110 and the multifunction product 2120 are connected to the network 140 such as Ethernet® to build up the LAN environment.

The PCs 100 and 110 mainly include the application A101a, the application B101b, the OS 102, and the printer driver 103, and the configuration of the PCs 100 and 110 is the same as that of the first embodiment. Therefore, in the PCs 100 and 110, at the time of initial printing of the document data by the application A101a or B101b, the printer driver 103 generates intermediate data, and the intermediate data is added with the action definition information by the action definition information adding unit 108, encrypted, and then saved in an HDD 1631 in the multifunction product 2120. The data structure of the generated intermediate data and the content of the action definition information added to the intermediate data are the same as the structure of the intermediate data and the content of the action definition information explained in the first embodiment.

The multifunction product 2120 is formed as functions of respective apparatus such as printer, copier, facsimile, and scanner are housed in one housing, and the multifunction product 2120 has a server function, with the PCs 100 and 110 being clients.

As shown in FIG. 21, the multifunction product 2120 in the fifth embodiment mainly includes a printer application 2121, a copy application 2135, a scan application 2126, a fax application 2127, an OS 2128, a printer engine 2133, a scanner engine 2134, and an HDD 2131.

The printer application 2121 is an application for a printer, having a PDL, a printer control language (PCL), and post script (PS), and functions as a printer server, with the PCs 100 and 110 being clients.

The printer application 2121 includes a decryption processor 2122, a processor 2123, a reprint and preview processor 2124, and a print data converter 2125.

The decryption processor 2122 reads the encrypted intermediate data 2132 from the HDD 2131 and decrypts the data by using a cryptographic key. The cryptographic key is obtained by receiving it from the PC 100 or 110.

The processor 2123 performs processing with respect to the intermediate data decrypted by the decryption processor 2122 according to the content of the action definition information included in the intermediate data. Specifically, processing such as deleting a keyword, adding a stamp, or adding an author name is carried out with respect to the intermediate data, for each user who has made a reprint request or a preview request, according to the action definition information.

The reprint and preview processor 2124 performs reprinting or preview processing, by using the intermediate data processed by the processor 2123 in response to the request from the PC 100 or 110. Specifically, processing such as transferring the decrypted intermediate data to be reprinted to the print data converter 2125, transferring single intermediate data generated by combining a plurality of decrypted intermediate data to the print data converter 2125, or transmitting the decrypted intermediate data to the PC 100 or 110 having made a preview request.

The print data converter 2125 converts the intermediate data decrypted by the decryption processor 2122 or the intermediate data generated by the reprint and preview processor 2124 into print data in a data format dependent on the printer engine 2133. For the print data format, for example, a PDL can be used.

The copy application 2135 executes copy processing, that is, performing image processing with respect to an image scanned by the scanner engine 2134, and transferring the image to the printer engine 2133.

The scan application 2126 executes scanner processing, that is, performing image processing with respect to the image scanned by the scanner engine 2134.

The fax application 2127 executes fax processing, that is, performing image processing with respect to the image scanned by the scanner engine 2134, and transmitting the fax, as well as saving an image received by fax in the HDD 2131.

The OS 2128 is a versatile OS such as Microsoft® Windows®, UNIX®, or Linux®, and has a spooler 2130 and a communication processor 2129.

The spooler 2130 accumulates print data or processed print data as printer jobs, and sequentially transmits the data to the printer 2133.

The communication processor 2129 controls communication between the equipment on the network 140 such as the PCs 100 and 110 and a protocol such as TCP/IP.

The printer engine 2133 is a hardware resource executing the printing processing, and the scanner engine 2134 is a hardware resource executing the scan processing.

The HDD 2131 is for storing the intermediate data 2132 and various data, wherein folders (or directories) for storing the intermediate data build up the network file system, so that write and reference from the PCs 110 and 110 side becomes possible.

The flow in the generation processing and the reprinting processing of the intermediate data by the PCs 100 and 110 in the fifth embodiment, and the processing of the intermediate data 2132 by the processor 2123 in the multifunction product 2120 to be performed in the reprinting processing are the same as in the second embodiment.

Therefore, the processor 2123 in the multifunction product 2120 determines the action in the processing according to the content of the action definition information stored in the intermediate data, and performs the processing with respect to the intermediate data.

Thus, in the printer system in the fifth embodiment, processing is carried out with respect to the intermediate data stored in the HDD 2132 in the multifunction product 2120, based on the action definition information indicating the action in the processing of the intermediate data for each user who uses the intermediate data, in response to a request from the PC 100 or 110. As a result, different processing for each user of the intermediate data can be performed with respect to the intermediate data, and hence various types of printing results can be obtained, while performing the printing processing efficiently.

Further, in the printer system according to the fifth embodiment, processing is performed with respect to the intermediate data based on the action definition information for each print job included in the intermediate data. Therefore, processing of the intermediate data different for each print job, as well as different for each user, can be performed. As a result, various printing results can be obtained, while performing the printing processing efficiently.

The printer system according to the fifth embodiment determines the action in the processing, corresponding to the attribute of the intermediate data for each user according to the action definition information added to the intermediate data. A printer system according to a sixth embodiment, however, determines the action in the processing, according to the action definition file stored in the multifunction product beforehand.

Figure 22:
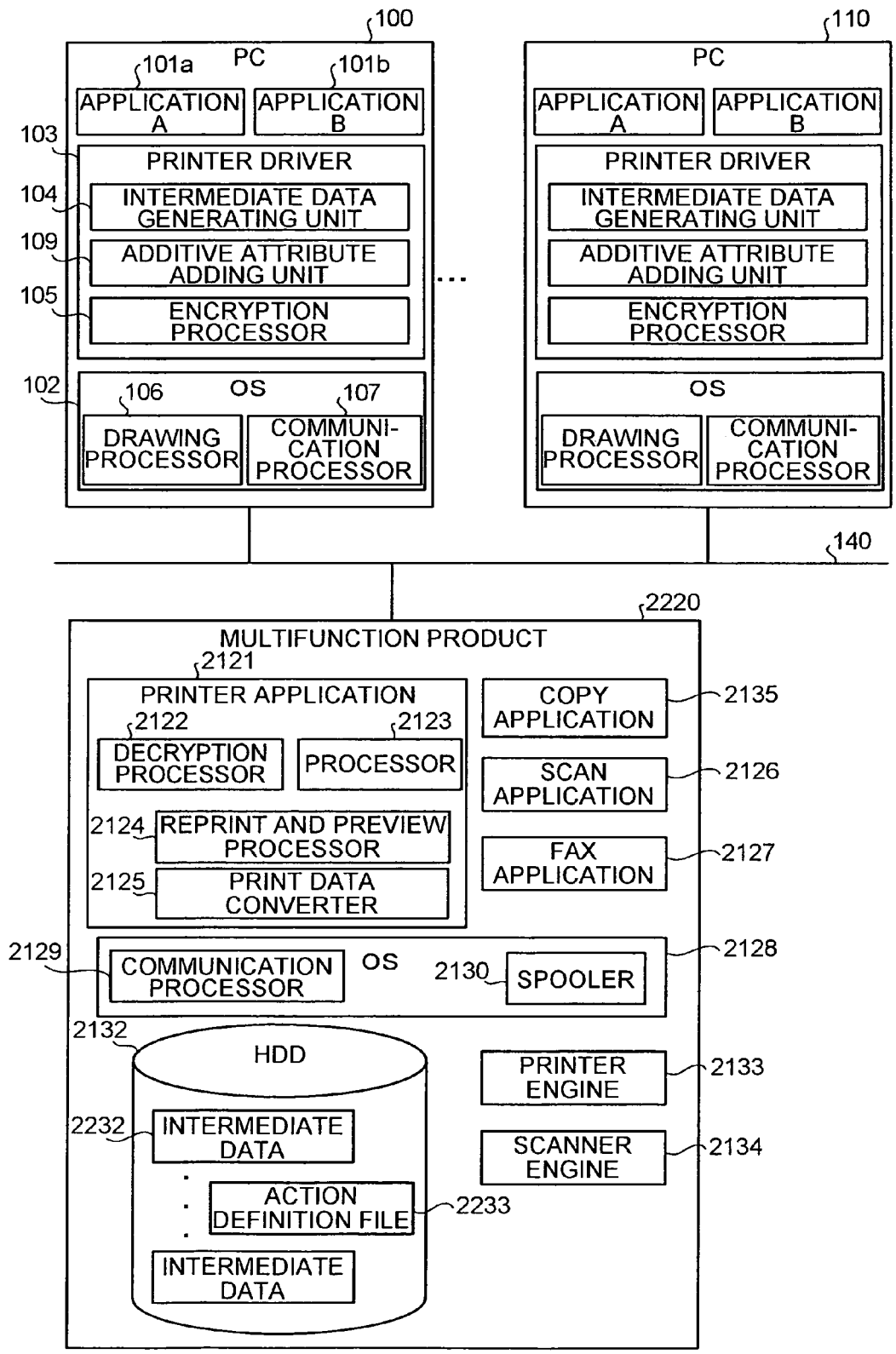
FIG. 22 is a block diagram of a network structure and a functional structure of a printer system according to a sixth embodiment of the present invention.

FIG. 22 is a block diagram of a network structure and a functional structure of a printer system according to the sixth embodiment.

The printer system according to the sixth embodiment includes a plurality of PCs 100 and 110 that issue a print request of a document file generated by the application A101*a* or B101*b*, and a multifunction product 2220 that generates print data upon reception of the print request from the PC 100 or 110 and prints the print data. The PCs 100 and 110 and the multifunction product 2220 are connected to the network 140 such as Ethernet® to build up the LAN environment.

The PCs 100 and 110 mainly include the application A101*a*, the application B101*b*, the OS 102, and the printer driver 103, and the configuration of the PCs 100 and 110 is the same as that of the first embodiment. Therefore, in the PCs 100 and 110, at the time of first printing of the document data by the application A101*a* or B101*b*, intermediate data is generated by the printer driver 103, encrypted, and stored in the HDD 2132 in the multifunction product 2220. The data structure of the generated intermediate data is the same as that of the intermediate data explained in the second embodiment.

As shown in FIG. 22, the multifunction product 2220 in the sixth embodiment mainly includes a printer application 2221, the copy application 2135, the scan application 2126, the fax application 2127, the OS 2128, the printer engine 2133, the scanner engine 2134, and the HDD 2132. The copy application 2135, the scan application 2126, the fax application 2127, the OS 2128, the printer engine 2133, and the scanner engine 2134 have the same functions as those of the multifunction product 2120 in the fifth embodiment.

The printer application 2121 is an application for a printer, having a PDL, PCL, and PS, and functions as a printer server, with the PCs 100 and 110 being clients.

The printer application 2221 includes the decryption processor 2122, a processor 2223, the reprint and preview processor 2124, and the print data converter 2125. The decryption processor 2122, the reprint and preview processor 2124, and the print data converter 2125 have the same functions as those in the fifth embodiment.

The processor 2223 performs processing with respect to the intermediate data decrypted by the decryption processor 2122 according to the content of the action definition file 2233 stored in the HDD 2132. Specifically, processing such as deleting a keyword, adding a stamp, or adding an author name is carried out with respect to the intermediate data 2232, for each user who has made a reprint request or a preview request, according to the action definition file 2233.

The HDD 2132 stores the action definition file 2233, as well as the intermediate data 2232 and various data as in the multifunction product 2120 in the fifth embodiment. Also in this HDD 2132, folders (or directories) for storing the intermediate data build up the network file system, as in the fifth embodiment, so that write and reference from the PCs 110 and 110 side becomes possible.

The action definition file 2233 is a data file defining the name of user and the content of the processing corresponding to the attribute of the intermediate data 2232, for each user, at the time of using the intermediate data 2232, and the content thereof is similar to that of the action definition file in the third embodiment.

The flow in the generation processing of the intermediate data by the PCs 100 and 110, the flow in the reprinting processing of the intermediate data by the multifunction product 2220, and the processing of the intermediate data 2232 by the processor 2223 in the multifunction product 2220 to be performed in the reprinting processing are the same as in the third embodiment.

Therefore, the processor 2223 in the multifunction product 2220 determines the action in the processing according to the content of the action definition file 2233 stored in the HDD 2132, and performs the processing with respect to the intermediate data.

Thus, in the printer system according to the sixth embodiment, processing is carried out with respect to the intermediate data stored in the HDD 2132 in the multifunction product 2220 based on the action definition file. As a result, various printing results can be obtained, while performing the printing processing efficiently, with diversity given to the security level of the printed document.

Further, in the printer system according to the sixth embodiment, since the processing is carried out with respect to the intermediate data based on the action definition file 127 stored in the HDD in the multifunction product 2220, processing corresponding to the user and the attribute of the intermediate data can be centrally managed and realized.

The printer system according to the sixth embodiment determines the action in the processing according to the action definition file 2233 stored in the HDD in the multifunction product 2220. A printer system according to a seventh embodiment, however, determines the action in the processing according to the action definition file stored beforehand in the information server on the network.

Figure 23:
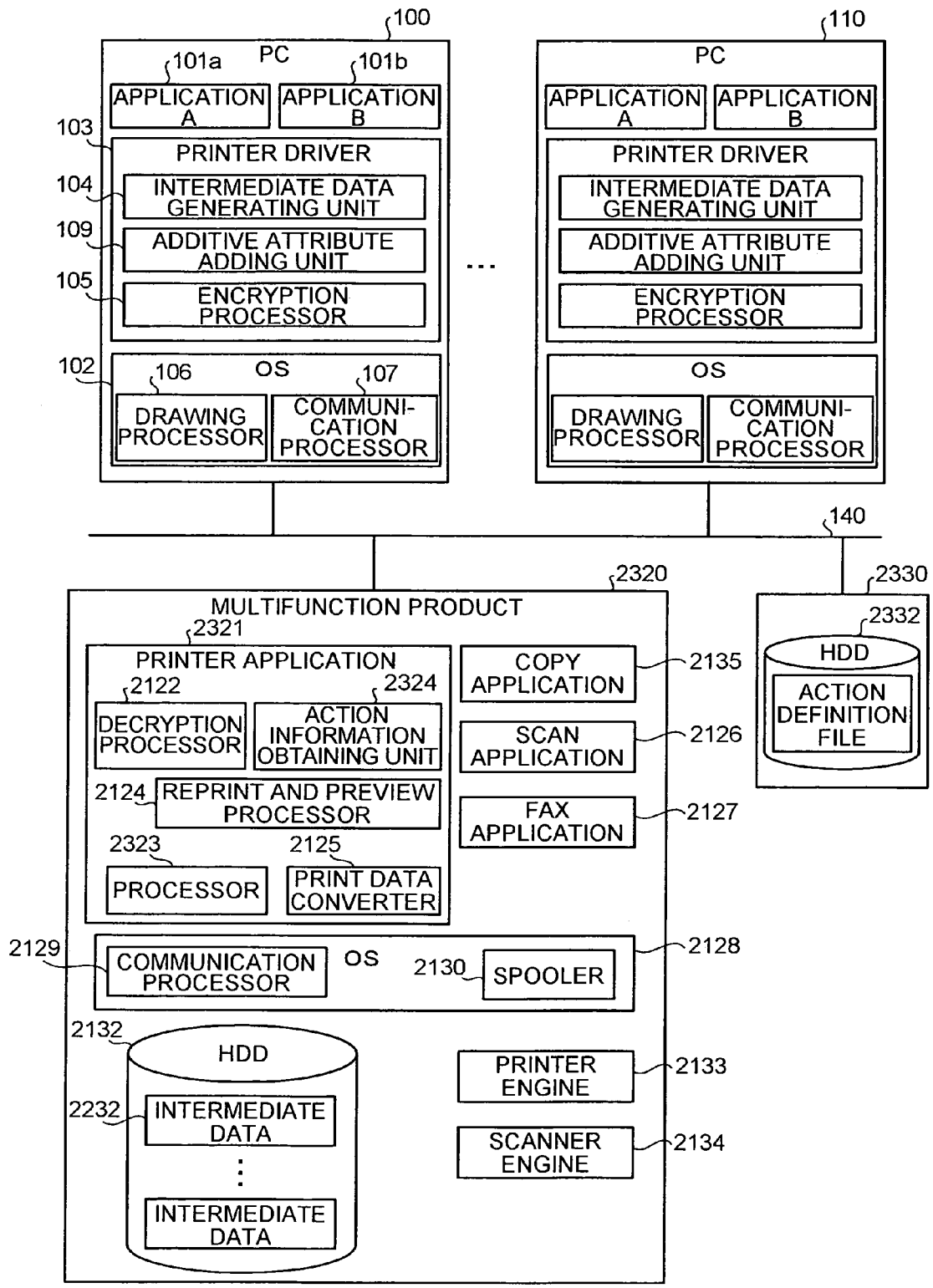
FIG. 23 is a block diagram of a network structure and a functional structure of a printer system according to a seventh embodiment of the present invention.

FIG. 23 is a block diagram of a network structure and a functional structure of a printer system according to the seventh embodiment.

The printer system according to the seventh embodiment includes a plurality of PCs 100 and 110 that issue a print request of a document file generated by the application A101*a* or B101*b*, a multifunction product 2320 that generates print data upon reception of the print request from the PC 100 or 110 and prints the print data, and an information server 2330 that holds an action definition file 2332. The PCs 100 and 110, the multifunction product 2320, and the information server 2330 are connected to the network 140 such as Ethernet® to build up the LAN environment. The information server 2330 may have a configuration such that it is connected to the PCs 100 and 110 and the multifunction product 2320 via the Internet.

The PCs 100 and 110 mainly include the application A101*a*, the application B101*b*, the OS 102, and the printer driver 103, and the configuration of the PCs 100 and 110 is the same as that of the first embodiment. Therefore, in the PCs 100 and 110, at the time of first printing of the document data by the application A101*a* or B101*b*, intermediate data is generated by the printer driver 103, encrypted, and stored in the HDD 2132 in the multifunction product 2320. The data structure of the generated intermediate data is the same as that of the intermediate data explained in the fourth embodiment.

As shown in FIG. 23, the multifunction product 2320 in the seventh embodiment mainly includes a printer application 2321, the copy application 2135, the scan application 2126, the fax application 2127, the OS 2128, the printer engine 2133, the scanner engine 2134, and the HDD 2132. The copy application 2135, the scan application 2126, the fax application 2127, the OS 2128, the printer engine 2133, and the scanner engine 2134 have the same functions as those of the multifunction product 2120 in the fifth embodiment.

The printer application 2321 is an application for a printer, having a PDL, PCL, and PS, and functions as a printer server, with the PCs 100 and 110 being clients.

The printer application 2321 includes the decryption processor 2122, an action information obtaining unit 2324, a processor 2323, the reprint and preview processor 2124, and the print data converter 2125. The decryption processor 2122, the reprint and preview processor 2124, and the print data converter 2125 have the same functions as those of the fifth embodiment.

The action information obtaining unit 2324 accesses the information server 2330 connected to the network, to receive an action definition file 2332 from the information server 2330. The information server 2330 can be accessed by specifying the URL preset in the printer server 2320.

The processor 2323 performs processing with respect to the intermediate data decrypted by the decryption processor 2122 according to the content of the action definition file 2332 obtained by the action information obtaining unit 2324. Specifically, processing such as deleting a keyword, adding a stamp, or adding an author name is carried out with respect to the intermediate data 2232, for each user who has made a reprint request or a preview request, according to the action definition file 2332.

The HDD 2132 stores the intermediate data 2232 and various data as in the multifunction product 2220 in the sixth embodiment. In the seventh embodiment, since the action definition file 2332 is received from the information server 2330 and used, the action definition file is not stored in the HDD 2132, different from the multifunction product 2220 in the sixth embodiment. Also in this HDD 2132, folders (or directories) for storing the intermediate data build up the network file system, as in the sixth embodiment, so that write and reference from the PCs 110 and 110 side becomes possible.

The information server 2330 includes the HDD 2131, and the action definition file 2332 is stored in the HDD 2131. The URL of the information server 2330 is preset in the memory such as RAM in the multifunction product 2320.

The action definition file 2332 is a data file defining the name of user and the content of the processing corresponding to the attribute of the intermediate data 2232, for each user, at the time of using the intermediate data 2232, and the structure and the content thereof is similar to those of the action definition file in the third and the sixth embodiment.

The flow in the generation processing of the intermediate data by the PCs 100 and 110, the flow in the reprinting processing of the intermediate data by the multifunction product 2320, and the processing of the intermediate data 2232 by the processor 2323 in the multifunction product 2320 to be performed in the reprinting processing are the same as in the fourth embodiment.

Therefore, the action information obtaining unit 2324 in the multifunction product 2320 receives the action definition file 2332 from the HDD 2131 in the information server 2330 on the network, to determine the action in the processing according to the content of the action definition file 2332 received by the processor 2332, and perform the processing with respect to the intermediate data.

Thus, in the printer system according to the seventh embodiment, processing is carried out based on the action definition file obtained from the information server, in response to a request from the PC 100 or 110. As a result, various printing results can be obtained, while performing the printing processing efficiently by using the intermediate data, with diversity given to the security level of the printed document.

Further, in the printer system according to the seventh embodiment, since the processing is carried out with respect to the intermediate data based on the action definition file 2332 received from the information server 2330 on the network, processing can be centrally managed and realized within the network.

The printer systems according to the first to the seventh embodiments, the action in the processing is determined according to the user and the type of the application data. In a printer system according to an eighth embodiment, however, the action in the processing is determined corresponding to a keyword in the intermediate data or a printer for outputting the data, and scaling and a discharge destination of the print data are determined.

The configuration and functional configuration of the printer system according to the eighth embodiment are the same as those of the printer system according to the third embodiment.

The PCs 100 and 110 have the same configuration as the PCs in the third embodiment, and the generated intermediate data has the same structure as that of the intermediate data in the third embodiment.

The printer server 1420 saves the encrypted intermediate data 127 generated by the PC 100 or 110 in the HDD 126, in response to the print-request from the PC 100 or 110. Further, the printer server 1420 converts the intermediate data 127 saved in the HDD 126 into print data dependent on the printer 130, according to a reprint request or a preview request from the PC 100 or 110, and transmits the print data to the printer 130. The printer server 1420 mainly includes the server processor 1428, the OS 131, and the HDD 126. The configuration of the printer server 1420 is the same as that of the third embodiment.

The processor 1424 performs processing with respect to the intermediate data decrypted by the decryption processor 122 according to the content of the action definition file 1430 stored in the HDD 126. Specifically, various types of processing is carried out with respect to the intermediate data 127 by a keyword in the intermediate data and a name of a printer that outputs the data, according to the action definition file 1430.

The HDD 126 stores the action definition file 1430, in addition to the intermediate data 127 and various data as with the printer server 120 in the third embodiment. In the case of the HDD 126, folders (or directories) for storing the intermediate data build up a network file system, so that write and reference from the PCs 110 and 110 side becomes possible.

The action definition file 1430 is a data file in which the output paper size, paper feed tray, paper discharge destination, two-sided/stapling/punching, and specified action are defined corresponding to a keyword in the intermediate data and a printer that outputs the data, when reprinting or preview processing is performed by using the intermediate data 127. FIG. 24 is an example of contents of the action definition file.

The action definition file 1430 is, as shown in FIG. 24, in a table format, and respective attributes of keyword, output printer, output paper size, paper feed tray, paper discharge destination, two-sided/stapling/punching, and specified action (addition processing, keyword processing) are set. The keyword and the output printer are search keys.

The keyword is a keyword included in the drawing data of the intermediate data, and the output printer is a printer that outputs the print data. The output paper size is the size of output paper for the print data, the paper feed tray is a paper feed tray for the print data, the paper discharge destination is a paper discharge destination of the print data, and two-sided/stapling/punching is a specification of print format at the time of printing the print data. The specified action includes addition processing and keyword processing, wherein addition processing is a specified action in the processing added to the print data, such as adding a logo mark. The keyword processing is a specified action in the processing with respect to the keyword, at the time of printing the intermediate data as print data.

The processing of the intermediate data by the printer system in the eighth embodiment will be explained here. The generation processing of the intermediate data by the PC 100 is the same as that of the third embodiment, and hence the explanation thereof is omitted.

Figure 25:
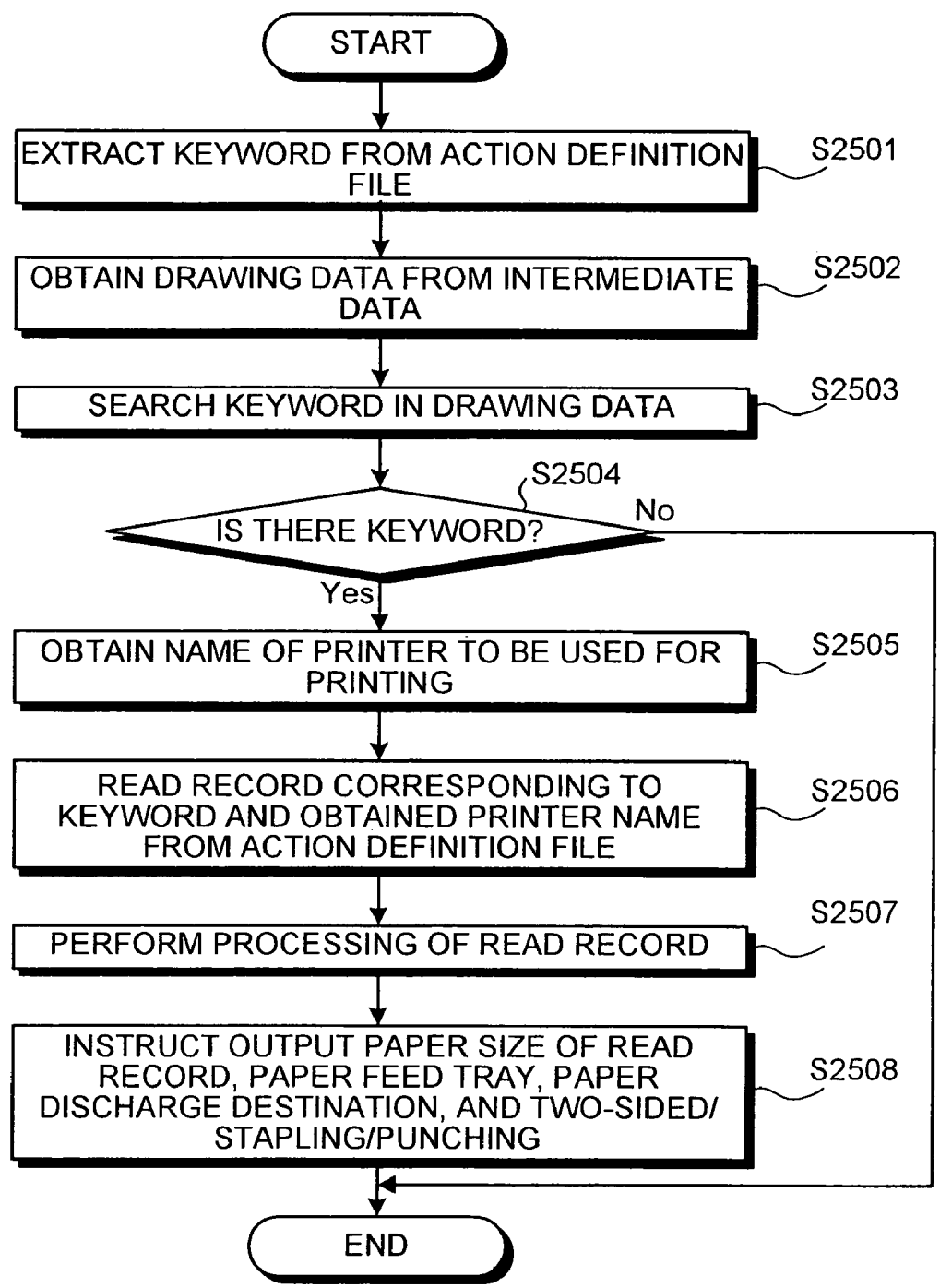
FIG. 25 is a flowchart of a processing procedure for the intermediate data performed by a processor in a printer server according to the eighth embodiment.

FIG. 25 is a flowchart of a processing procedure for the intermediate data performed by the processor 1424 in the printer server 1420.

The processor 1424 extracts all keywords from the action definition file 1430 stored in the HDD 126 (step S2501). The processor 1424 then obtains drawing data from the intermediate data (step S2502), and searches the keywords obtained from the action definition file 1424 in the drawing data (step S2503), to check if there is any keyword in the drawing data (step S2504).

When the processor 1424 determines that there is no keyword therein (step S2504: No), the processor 1424 finishes the processing, to perform normal printing processing.

On the other hand, at step S2504, when the processor 1424 determines that there is the keyword therein (step S2504: Yes), the processor 1424 obtains an output printer to be used for printing, specified by the PC 100 or 110 (step S2505).

The processor 1424 uses the keyword in the drawing data and the obtained output printer as keys to read a record corresponding to the keys from the action definition file 1430 (step S2506).

The processor 1424 performs processing of the specified action for the read record with respect to the intermediate data (step S2507). The processor 1424 then transmits instructions for the output paper size, the paper feed tray, the paper discharge destination, and two-sided/stapling/punching to the reprint and preview processor 129. Such instructions may be added to the information in the intermediate data, for example, to the additive information, and may be obtained from the intermediate data at the time of printing.

For example, when there is a keyword "SEIKYUU01" in the drawing data of the intermediate data, and the specified output printer is "color printer A", the intermediate data is "reduced to A4 size" as the output paper size, "tray 1" is specified as the paper feed tray, "paper discharge bin 3" is specified as the paper discharge destination based on the action definition file 1430, and processing of "adding a company logo mark" and "deleting the keyword" is performed with respect to the intermediate data, as the specified action.

For example, when there is a keyword "URIAGE01" in the drawing data of the intermediate data, and when the specified output printer is "not specified", the intermediate data is "enlarged to A3 size" as the output paper size, the paper feed tray is not specified, "paper discharge bin 1" is specified as the paper discharge destination, and "upper two-hole punching" is specified based on the action definition file 1430. The processing of "adding a confidential stamp" and converting the keyword "URIAGE01" into "sales" is performed with respect to the intermediate data, as the specified action.

Thus, in the printer system according to the eighth embodiment, since the paper discharge destination, the paper feed tray, two-sided/stapling/punching are specified with respect to the intermediate data stored in the HDD 126 in the printer server 1420 based on the action definition, various printing results can be obtained, thereby enabling efficient printing processing using the intermediate data.

Since deletion and conversion of the keyword based on the character string are performed with respect to the intermediate data, keyword processing can be performed easily, as compared with an instance when keyword processing is performed with respect to print data in a bit-map format, thereby enabling efficient printing processing.

Further, since scaling is performed with respect to the intermediate data, the quality of the output image can be improved, as compared with an instance when scaling is performed with respect to print data in a bit-map format.

In the eighth embodiment, the action definition file 1430 is used. However, as in the second embodiment, the information shown in FIG. 24 may be included in the intermediate data as the action definition information.

In the eighth embodiment, the processing by using the action definition file 1430 shown in FIG. 24 is realized by the printer server. However, as in the sixth embodiment, the action definition file 1430 may be stored in the multifunction product, and the processing may be performed by the multifunction product side.

In the eighth embodiment, the action definition file 1430 shown in FIG. 24 is stored in the printer server. However, as in the seventh embodiment, the action definition file 1430 shown in FIG. 24 may be stored in the information server on the network, and obtained from the information server by the printer server or the multifunction product via the network, to perform the processing of the intermediate data.

In the printer system according to the first to the eighth embodiment, the intermediate data is stored and processed by the printer server or the multifunction product, specifying the PC as a client, however, the processing may be performed on the PC side. Further, generation, save, processing, reprinting and preview processing, print data conversion processing, and transmission processing of the intermediate data may be performed all on the PC side, or on the printer server or the multifunction product side.

In the printer system according to the first to the eighth embodiment, the intermediate data is encrypted and stored in the HDD, however, it is not always necessary to encrypt the intermediate data when stored.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A printer server that generates print data in a format dependent on a printer connected to a network, from application data to be printed out by an application, comprising:
   a processing unit that processes independent data including image data to thereby generate processed independent data, by modifying the image data of the independent data based on additive attribute information in the independent data, the additive attribute information including a confidential level for a document to be printed by the application, wherein the independent data is data that does not depend on the printer and that is generated from the application data, the additive attribute information is added to the independent data when the independent data is generated, and the processing unit modifies the image data based on the confidential level included in the additive attribute information;
   a converter that converts the processed independent data including the modified image data into print data in a format dependent on the printer; and
   a transmitter that transmits the print data to the printer.

2. The printer server according to claim 1, wherein the processing unit processes the independent data based on data attribute information that indicates data attribute of the data independent.

3. The printer server according to claim 2, wherein the processing unit processes the independent data based on user attribute information that indicates attribute of a user who uses the independent data.

4. The printer server according to claim 1, wherein the independent data is intermediate data, being a general-purpose metafile for printing.

5. The printer server of claim 1, wherein said processed independent data is independent data that is customized for the use of a user connected to said network, in response to a request by said user for access to the independent data, and
 wherein said processed independent data is data that does not depend on any printer apparatus.

6. The printer server of claim 1, wherein said additive attribute information identifies said application that generates said application data.

7. The printer server of claim 1, wherein said additive attribute information includes a term of validity of the independent data.

8. The printer server of claim 1, wherein said confidential level in said additive attribute information indicates a security importance level of the independent data.

9. The printer server of claim 1, wherein said additive attribute information includes a specification indicating that addition of the author name to the print data is essential.

10. The printer server of claim 1, wherein said additive attribute information includes a document type indicating the type of document of the print data.

11. The printer server of claim 1, wherein said additive attribute information includes color/monochrome information, indicating whether the print data is a color or monochrome document.

12. The printer server of claim 1, wherein said processing unit processes said independent data to thereby generate said processed independent data, by deleting one or more keywords from the image data of the independent data, based on said additive attribute information.

13. The printer server of claim 1, wherein said processing unit processes said independent data to thereby generate said processed independent data, by adding a stamp to the image data of the independent data, based on said additive attribute information.

14. The printer server of claim 1, wherein said processing unit processes said independent data to thereby generate said processed independent data, by adding a user name to the image data of the independent data, based on said additive attribute information.

15. The printer server of claim 1, wherein said processing unit compares said confidential level and a predetermined value, and modifies the image data of the independent data if said confidential level is greater than or equal to the predetermined value, and
 said processing unit does not modify the image data of the independent data if said confidential level is below the predetermined value.

16. The printer server of claim 1, wherein the independent data further includes file attribute information including user identification information of an author of the independent data and group identification information of a group to which said author belongs, and
 said processing unit modifies the image data of the independent data based on said additive attribute information and said file attribute information.

17. A client terminal that makes a print request for a printer connected to a network to a printer server connected to the network, comprising:
 an independent data generating unit that generates independent data including image data that does not depend on the printer, wherein the independent data is generated from application data;
 an additive attribute adding unit that adds to the independent data additive attribute information, the additive attribute information including a confidential level for a document to be printed by the application; and
 a sending unit that sends the independent data to the print server,
 wherein the server processes the independent data to thereby generate processed independent data, by modifying the image data of the independent data based on said additive attribute information in the independent data, and
 wherein the modification of the image data by the server to obtain modified image data that is included in the processed independent data is based on the confidential level included in the additive attribute information.

18. The client terminal according to claim 17, further comprising an action definition information adding unit that adds to the independent data action definition information indicating an action in the processing of the independent data for each user who uses the independent data.

19. The client terminal according to claim 17, wherein the independent data is intermediate data, being a general-purpose metafile for printing.

* * * * *